(12) United States Patent
Nightingale et al.

(10) Patent No.: US 8,533,299 B2
(45) Date of Patent: Sep. 10, 2013

(54) LOCATOR TABLE AND CLIENT LIBRARY FOR DATACENTERS

(75) Inventors: Edmund B. Nightingale, Redmond, WA (US); Jeremy E. Elson, Kirkland, WA (US); Jonathan R. Howell, Seattle, WA (US); Galen C. Hunt, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 346 days.

(21) Appl. No.: 12/763,107

(22) Filed: Apr. 19, 2010

(65) Prior Publication Data

US 2011/0258297 A1 Oct. 20, 2011

(51) Int. Cl.
G06F 17/30 (2006.01)

(52) U.S. Cl.
USPC ............ 709/220; 709/224; 709/203; 709/228

(58) Field of Classification Search
USPC ........... 709/203, 220, 224, 229, 232; 714/4.1
See application file for complete search history.

(56) References Cited

U.S. PATENT DOCUMENTS

| | | |
|---|---|---|
| 4,491,945 A | 1/1985 | Turner |
| 4,780,870 A | 10/1988 | McHarg et al. |
| 5,305,320 A | 4/1994 | Andrews et al. |
| 5,408,649 A | 4/1995 | Beshears et al. |
| 5,423,046 A | 6/1995 | Nunnelley et al. |
| 5,553,285 A | 9/1996 | Krakauer et al. |
| 5,621,884 A | 4/1997 | Beshears et al. |
| 5,663,951 A | 9/1997 | Danneels et al. |
| 5,914,878 A | 6/1999 | Yamamoto et al. |
| 5,938,732 A | 8/1999 | Lim et al. |
| 6,424,979 B1 * | 7/2002 | Livingston et al. ............ 715/206 |
| 6,577,613 B1 | 6/2003 | Ramanathan |
| 6,850,489 B1 | 2/2005 | Omi et al. |
| 6,871,295 B2 | 3/2005 | Ulrich et al. |
| 6,963,996 B2 | 11/2005 | Coughlin |
| 7,076,555 B1 * | 7/2006 | Orman et al. .................. 709/227 |
| 7,113,993 B1 | 9/2006 | Cappiello et al. |
| 7,115,919 B2 | 10/2006 | Kodama |
| 7,139,933 B2 | 11/2006 | Hsu et al. |
| 7,171,491 B1 | 1/2007 | O'Toole et al. |

(Continued)

FOREIGN PATENT DOCUMENTS

WO WO2010108368 A1 9/2010

OTHER PUBLICATIONS

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

(Continued)

*Primary Examiner* — Khanh Dinh
(74) *Attorney, Agent, or Firm* — Lee & Hayes, PLLC

(57) ABSTRACT

A system including a plurality of servers, a client, and a metadata server is described herein. The servers each store tracts of data, a plurality of the tracts comprising a byte sequence and being distributed among the plurality of servers. To locate the tracts, the metadata server generates a table that is used by the client to identify servers associated with the tracts, enabling the client to provide requests to the servers. The metadata server also enables recovery in the event of a server failure. Further, the servers construct tables of tract identifiers and locations to use in responding to the client requests.

20 Claims, 11 Drawing Sheets

(56) References Cited

U.S. PATENT DOCUMENTS

| | | | |
|---|---|---|---|
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,342,876 B2 | 3/2008 | Bellur et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 * | 7/2010 | Bots et al. | 707/624 |
| 7,769,843 B2 | 8/2010 | Neuse et al. | |
| 7,774,469 B2 | 8/2010 | Massa et al. | |
| 7,801,994 B2 | 9/2010 | Kudo | |
| 7,805,580 B2 | 9/2010 | Hirzel et al. | |
| 8,010,829 B1 | 8/2011 | Chatterjee et al. | |
| 8,074,107 B2 | 12/2011 | Sivasubramanian et al. | |
| 8,160,063 B2 | 4/2012 | Maltz et al. | |
| 8,181,061 B2 * | 5/2012 | Nightingale et al. | 714/4.11 |
| 8,234,518 B2 | 7/2012 | Hansen | |
| 8,261,033 B1 | 9/2012 | Slik et al. | |
| 2002/0152293 A1 | 10/2002 | Hahn et al. | |
| 2002/0194245 A1 | 12/2002 | Simpson et al. | |
| 2004/0153479 A1 | 8/2004 | Mikesell et al. | |
| 2005/0075911 A1 * | 4/2005 | Craven, Jr. | 705/4 |
| 2005/0078655 A1 | 4/2005 | Tiller et al. | |
| 2005/0094640 A1 | 5/2005 | Howe | |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0280168 A1 | 12/2006 | Ozaki | |
| 2007/0025381 A1 | 2/2007 | Feng et al. | |
| 2007/0156842 A1 | 7/2007 | Vermeulen et al. | |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2008/0114827 A1 | 5/2008 | Gerber et al. | |
| 2009/0006888 A1 | 1/2009 | Bernhard et al. | |
| 2009/0106269 A1 | 4/2009 | Zuckerman et al. | |
| 2009/0112921 A1 | 4/2009 | Oliveira et al. | |
| 2009/0113323 A1 | 4/2009 | Zhao et al. | |
| 2009/0183002 A1 | 7/2009 | Rohrer et al. | |
| 2009/0204405 A1 | 8/2009 | Kato et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1 | 10/2009 | Lacapra et al. | |
| 2009/0300407 A1 | 12/2009 | Kamath et al. | |
| 2009/0307329 A1 | 12/2009 | Olston et al. | |
| 2010/0008230 A1 | 1/2010 | Khandekar et al. | |
| 2010/0008347 A1 | 1/2010 | Qin et al. | |
| 2010/0094955 A1 | 4/2010 | Zuckerman et al. | |
| 2010/0094956 A1 | 4/2010 | Zuckerman et al. | |
| 2010/0161657 A1 | 6/2010 | Cha et al. | |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0250746 A1 | 9/2010 | Murase | |
| 2010/0332818 A1 | 12/2010 | Prahlad et al. | |
| 2011/0022574 A1 | 1/2011 | Hansen | |
| 2011/0153835 A1 | 6/2011 | Rimac et al. | |
| 2011/0246471 A1 | 10/2011 | Rakib | |
| 2011/0246735 A1 | 10/2011 | Bryant et al. | |
| 2011/0258290 A1 * | 10/2011 | Nightingale et al. | 709/219 |
| 2011/0258297 A1 * | 10/2011 | Nightingale et al. | 709/220 |
| 2011/0258482 A1 * | 10/2011 | Nightingale et al. | 714/4.1 |
| 2011/0258488 A1 * | 10/2011 | Nightingale et al. | 714/15 |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0054556 A1 | 3/2012 | Grube et al. | |
| 2012/0197958 A1 * | 8/2012 | Nightingale et al. | 709/201 |

OTHER PUBLICATIONS

Bafna et al, "CHIRAYU: A Highly Available Metadata Server for Object Based Storage Cluster File System," retrieved from <<http://abhinaykampasi.tripod.com/TechDocs/ChirayuPaper.pdf, IEEE Bombay Section, Year 2003 Prof K Shenker Student Paper & Project Contest, Apr. 2003, 6 pgs.

Buddhikot et al, "Design of a Large Scale Multimedia Storage Server," Journal Computer Networks and ISDN Systems, vol. 27, Issue 3, Dec. 1994, pp. 1-18.

Chen et al, "Replication-Based Highly Available Metadata Management for Cluster File Systems," 2010 IEEE International Conference on Cluster Computing, Sep. 2010, pp. 292-301.

Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.

Fu, at al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Sinnamohideen at al, "A Transparently-Scalable Metadata Service for the Ursa Minor Storage System," USENIX ATC'10 Proceedings of the 2010 USENIX Conference, Jun. 2010, 14 pgs.

Weil et al, "CRUSH: Controlled, Scalable, Decentralized Placement of Replicated Data," Proceedings of SC '06, Nov. 2006, 12 pgs.

Weiser, "Some Computer Science Issues in Ubiquitous Computing," retrieved at https://www.cs.ucsb.edu/~ravenben/papers/coreos/Wei93.pdf, Mar. 1993, 14 pgs.

Non-Final Office Action for U.S. Appl. No. 12/763,133, mailed on Sep. 16, 2011, Edmund Nightingale, "Memory Management and Recovery for Datacenters", 18 pages.

"Citrix Storage Delivery Services Adapter for NetApp Data ONTAP", retrieved on Mar. 9, 2010 at http://citrix.com/site/resources/dynamic/partnerDocs/datasheet_adapter.pdf>, Citrix Systems, Citrix Storage Delivery Services Data sheet, 2008, 2 pgs.

"EMC RecoverPoint Family: Cost-effective local and remote data protection and disaster recovery solution", retrieved on Mar. 9, 2010 at http://www.emc.com/collateral/software/data-sheet/h2769-emc-recoverpoint-family.pdf>>, EMC Corporation, Data Sheet H2769.8, 2010, 3 pgs.

Office Action for U.S. Appl. No. 12/766,726, mailed on May 29, 2012, Nightingale et al., "Bandwidth-Proportioned Datacenters", 21 pages.

U.S. Appl. No. 12/410,697, "Data Center Without Structural Bottlenecks," Maltz et al, filed Mar. 25, 2009.

U.S. Appl. No. 12/410,745, "Data Center Interconnect and Traffic Engineering," Maltz et al, filed Mar. 25, 2009.

U.S. Appl. No. 12/578,608, "Agile Data Center Network Architecture," Greenberg et al, filed Oct. 14, 2009.

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.

ffice action for U.S. Appl. No. 13/412,944, mailed on Oct. 11, 2012, Nightingale et al., "Reading and Writing During Cluster Growth Phase", 10 pages.

Office action for U.S. Appl. No. 13/112,978, mailed on Dec. 14, 2012, Elson et al., "Data Layout for Recovery and Durability", 15 pages.

Office action for U.S. Appl. No. 13/017,193, mailed on Dec. 3, 2012, Nightingale et al., "Parallel Serialization of Request Processing", 19 pages.

PCT Search Report mailed Oct. 23, 2012 for PCT application No. PCT/US2012/035700, 10 pages.

Office action for U.S. Appl. No. 13/116,270, mailed on Feb. 15, 2013, Nightingale et al., "Server Failure Recovery", 16 pages.

Rhea et al., "Maintenance-Free Global Data Storage", IEEE Internet Computing, 2001, 17 pages, Mar. 11, 2013.

Office action for U.S. Appl. No. 13/017,193, mailed on Jun. 3, 2013, Nightingale et al., "Parallel Serialization of Request Processing", 21 pages.

Non-Final Office Action for U.S. Appl. No. 13/112,978, mailed on Jul. 17, 2013, Elson et al., "Data Layout for Recovery and Durability", 15 pages.

* cited by examiner

Locator Table 108

| Repres. 202 | Servers 204 |
|---|---|
| 0000 | A, B, C |
| 0001 | D, E, F |
| . . . | . . . |
| 10110011 | Y, Z, A |

Locator Table Version Number 206

FIG. 2

LOCATOR TABLE AND CLIENT LIBRARY FOR DATACENTERS

BACKGROUND

Large-scale network-based services often require large-scale data storage. For example, Internet email services store large quantities of user inboxes, each user inbox itself including a sizable quantity of data. This large-scale data storage is often implemented in datacenters comprised of storage and computation devices. The storage devices are typically arranged in a cluster and include redundant copies. This redundancy is often achieved through use of a redundant array of inexpensive disks (RAID) configuration and helps minimize the risk of data loss. The computation devices are likewise typically arranged in a cluster.

Both sets of clusters often suffer a number of bandwidth bottlenecks that reduce datacenter efficiency. For instance, a number of storage devices or computation devices can be linked to a single network switch. Network switches are traditionally arranged in a hierarchy, with so-called "core switches" at the top, fed by "top of rack" switches, which are in turn attached to individual computation devices. The "Top of rack" switches are typically provisioned with far more bandwidth to the devices below them in the hierarchy than to the core switches above them. This causes congestion and inefficient datacenter performance. The same is true within a storage device or computation device: a storage device is provisioned with disks having a collective bandwidth that is greater than a collective network interface component bandwidth. Likewise, computations devices are provisioned with an input/output bus having a bandwidth that is greater than the collective network interface bandwidth.

To increase efficiency, many datacenter applications are implemented according to the Map-Reduce model. In the Map-Reduce model, computation and storage devices are integrated such that the program read and writing data is located on the same device as the data storage. The Map-Reduce model introduces new problems for programmers and operators, constraining how data is placed, stored, and moved to achieve adequate efficiency over the bandwidth-congested components. Often, this may require fragmenting a program into a series of smaller routines to run on separate systems.

In addition to bottlenecks caused by network-bandwidth, datacenters also experience delays when retrieving large files from storage devices. Because each file is usually stored contiguously, the entire file is retrieved from a single storage device. Thus, the full bandwidth of the single storage device is consumed in transmitting the file while other storage devices sit idle.

Also, datacenter efficiency is often affected by failures of storage devices. While the data on a failed storage device is usually backed up on another device, as mentioned above, it often takes a significant amount of time for the device storing the backed up data to make an additional copy on an additional device. And in making the copy, the datacenter is limited to the bandwidths of the device making the copy and the device receiving the copy. The bandwidths of other devices of the datacenter are not used.

Additionally, to efficiently restore a failed storage device, the storage device and its replica utilize a table identifying files stored on the storage device and their locations. Failure to utilize such a table requires that an entire storage device be scanned to identify files and their locations. Use of tables also introduces inefficiencies, however. Since the table is often stored at a different location on the storage device than the location being written to or read from, the component performing the reading/writing and table updating must move across the storage device. Such movements across the storage device are often relatively slow.

SUMMARY

Systems described herein include a plurality of servers, a client, and a metadata server. The servers each store tracts of data, a plurality of the tracts comprising a byte sequence and being distributed among the plurality of servers. The client provides requests associated with tracts to the servers and identifies the servers using a locator table. The locator table includes multiple entries each pairing a representation of one or more tract identifiers with identifiers of servers. Also, the client determines whether a byte sequence associated with a write request is opened in an append mode or a random write mode and performs the write request accordingly. The metadata server generates the locator table and provides it to the client. The metadata server also enables recovery in the event of a server failure by instructing servers storing tracts that are also stored on the failed server to provide those tracts to additional servers. Further, the servers construct tables of tract identifiers and tract locations by scanning server memory for the tract identifiers and noting the locations where tracts associated with the identifiers are stored. In some implementations, rather than scanning an entire server memory, a server scans only a part of the memory marked "out of date" in the table, updates the entry marked "out of date" based on the scan, and marks an entry associated with another part of memory "out of date" to enable writes to that other part of memory without having to update the table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 2 illustrates a block diagram showing an example locator table, in accordance with various embodiments.

DETAILED DESCRIPTION

Figure 1:
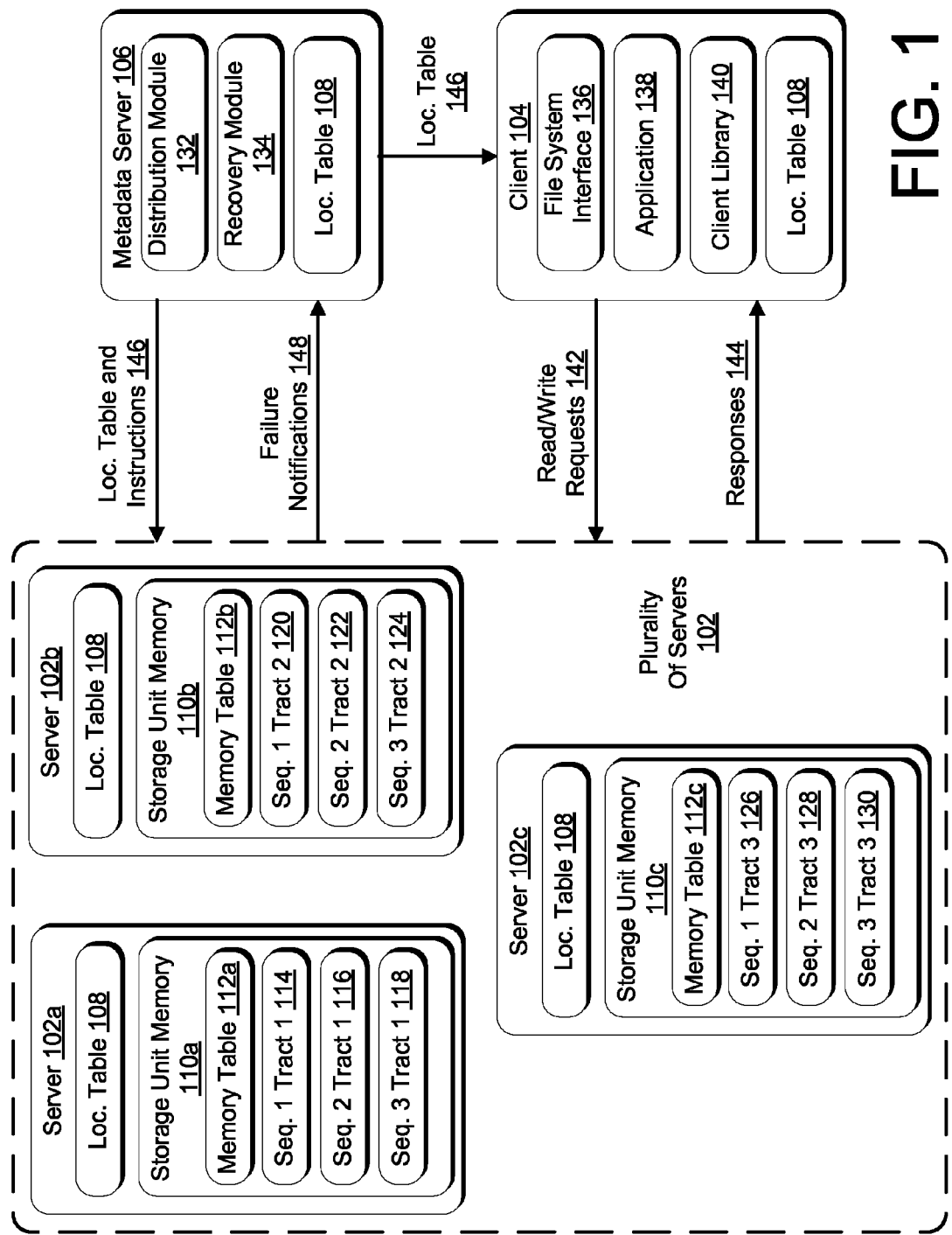
FIG. 1 illustrates a block diagram showing an example architecture of servers, a client, and a metadata server, in accordance with various embodiments.

Described herein are servers, clients, and metadata servers, as well as systems including combinations of multiple servers, at least one client, and at least one metadata server. Such systems are used in datacenters for data storage and input/output operations. For example, a system described herein could be a datacenter for a word processing service. Each document of the word processing service corresponds to a byte sequence. Byte sequences, whether corresponding to documents or some other sort of data, are comprised of "tracts" of data. The tracts each have a predetermined same size, such as one megabyte, and represent the smallest unit of data that can be read from or written to a storage unit that maximizes performance. For example, on a mechanical device, such as a disk, the "tract" size would be large enough to avoid giving up performance due to the lost opportunity of reading more data "for free" after a seek or rotational delay. As a second example, on a medium such as flash, the "tract" size would be calculated based on the chip bandwidth and characteristics of the flash storage medium. To make full use of the bandwidth of storage nodes implementing the servers, the tracts of a byte sequence are distributed across the servers, thus enabling the client to read from and write to multiple servers simultaneously when reading from or writing to a byte sequence.

The tracts are distributed among the servers by a locator table. The locator table is generated by the metadata server and provided to the client and the servers. The table indexes the servers storing the tracts by associating the servers with representations, such as bit patterns. For example, the representations could each have a bit length of three, allowing for eight possible representations. Each of these eight representations is associated with one or more servers. Further, each representation could correspond to a prefix included in a translation to a fixed length of a tract identifier. Each prefix matches one of the eight representations and the tract associated with that prefix is assigned to the servers associated with the matching representation. These translations are calculated by the client using a client library. In one implementation, the translations are hashes of tract identifiers calculated using a hash algorithm. An effect of the translation process is that two adjacent tracts in a byte sequence which have similar tract identifiers will have dissimilar translations. For example, each tract identifier may share the same first three bits, such as "001", but their translations may have different first bits, such as "110" and "010." Because of the translation process and the manner of assignment in the locator table, two adjacent tracts of a byte sequence are assigned to different servers, resulting in a distribution of tracts among the servers, such as a uniform distribution. When the client reads from or writes to the byte sequence, the client now does so at the combined bandwidth of the multiple servers storing the multiple tracts of the byte sequence.

In addition to enabling distribution of the tracts among the servers, the locator table also enables recovery in the event of a server failure. When a server fails, the metadata server is notified of the failure and identifies the representations associated with the failing server. The metadata server also identifies other servers associated with those representations and instructs one of the other servers for each representation to write the tracts associated with that representation to an additional server. The effect of these instructions is to create a replica of each tract stored on the failed server through use of multiple other servers writing to multiple additional servers at the combined bandwidth of those other servers.

The client library also serves further purposes. For example, the client library enables the client to determine if a byte sequence is opened in an append mode or in a random write mode. If opened in an append mode, the client library requests allocation of memory for a next available tract of data for a byte sequence and writes to that tract. For example, if tracts one through three have been written to, the client library would request allocation of tract four. Once allocated to the requesting client, other clients cannot write to tract four. If the byte sequence has instead been opened in a random write mode, the client simply attempts to write to the next available tract and relies on a locking mechanism associated with the byte sequence to ensure data integrity.

The servers comprising the datacenter are also configured to operate more efficiently. Each server stores tracts contiguously in its storage and reserves the last bits of the tract to store the tract identifier. Because tracts have the same length as one another and tract identifiers have the same length as one another, the memory can be more efficiently scanned based on these lengths to generate a table of tracts stored on the server that includes tract identifiers and associated tract locations.

To further improve efficiency, the tables stored at the servers are constructed incrementally. When a write request is first received, the server marks entries in a table as "out of date." These entries correspond to a part of the storage of the server that is large enough to store multiple tracts. The server then writes tracts to that part of the storage until it is full. Once full, the server updates the entries marked "out of date" with the tract identifiers and tract locations of the tracts written to the part of the storage. The server then marks additional entries of another part of the storage as "out of date" and proceeds as before. If the server fails during this process, it only needs to scan the part of storage corresponding to the entries marked "out of date" in recovery to arrive at an up-to-date table. By updating the table after multiple write operations rather than after each write, the server reduces the number of times that a storage unit component (e.g., a head of a disk storage unit) travels across the storage unit. Such movements across a storage unit are often relatively slow and can be a major factor in inefficient operation of a storage unit.

In some implementations, the servers are implemented on storage nodes belonging to storage clusters of the datacenter and the clients are implemented on computation nodes belonging to computation clusters of the datacenter. Within each node, the bandwidth of the node's network interface components and the bandwidth of the node's other components are proportioned to one another to avoid bottlenecks associated with the bandwidth of the network interface components.

The following paragraphs further describe the servers, client, and metadata server and make reference to figures illustrating the servers, client, and metadata server, a number of their aspects, and their operations.

Example Architecture

FIG. 1 illustrates a block diagram showing an example architecture of servers, a client, and a metadata server, in accordance with various embodiments. As illustrated, a plurality of servers 102 communicate with a client 104 and metadata server 106. Each server of the plurality of servers 102 includes a locator table 108, the locator table 108 specifying tracts that are to be stored on each of the servers 102. The servers 102 include server 102a having a storage unit memory 110a, server 102b having a storage unit memory 110b, and server 102c having storage unit memory 110c. Although servers 102 are only shown as including three servers 102, the servers 102 may include any number of servers 102. The storage unit memory 110a stores a memory table 112a and tracts from multiple byte sequences, including sequence-1 tract-1 114, sequence-2 tract-1 116, and sequence-3 tract-1 118. The storage unit memory 110b stores a memory table 112b and tracts from multiple byte sequences, including sequence-1 tract-2 120, sequence-2 tract-2 122, and sequence-3 tract-2 124. The storage unit memory 110c stores a memory table 112c and tracts from multiple byte sequences, including sequence-1 tract-3 126, sequence-2 tract-3 128, and sequence-3 tract-3 130. While the servers 102 are each shown as storing tracts of a same place within their respective sequences (e.g., server 102a stores the first tract of three different sequences), any server can store any tract of any byte sequence, so long as the tracts for any byte sequence are distributed among the servers 102.

As is also shown in FIG. 1, the metadata server 106 includes a distribution module 132 for generating the locator table 108 and a recovery module 134 for managing recovery in the event that one of the servers 102 fails.

The client 104 includes a file system interface 136 enabling a user or application, such as application 138, to interact with a client library 140. The client library 140 enables the client 104 to formulate and transmit read and write requests 142 to the servers 102 and the receive responses 144 in return. As is also shown, the client 104 includes a locator table 108 to enable the client library 140 to identify the servers 102 to transmit the requests 142 to. The client 104 and servers 102 receive 146 the locator table 108 from the metadata server 106, which generates and also stores a copy of the locator table 108. The metadata server 106 also receives notifications 148 of failure of a server 102, in some embodiments, triggering the recovery module 134 to perform recovery operations.

Figure 10:
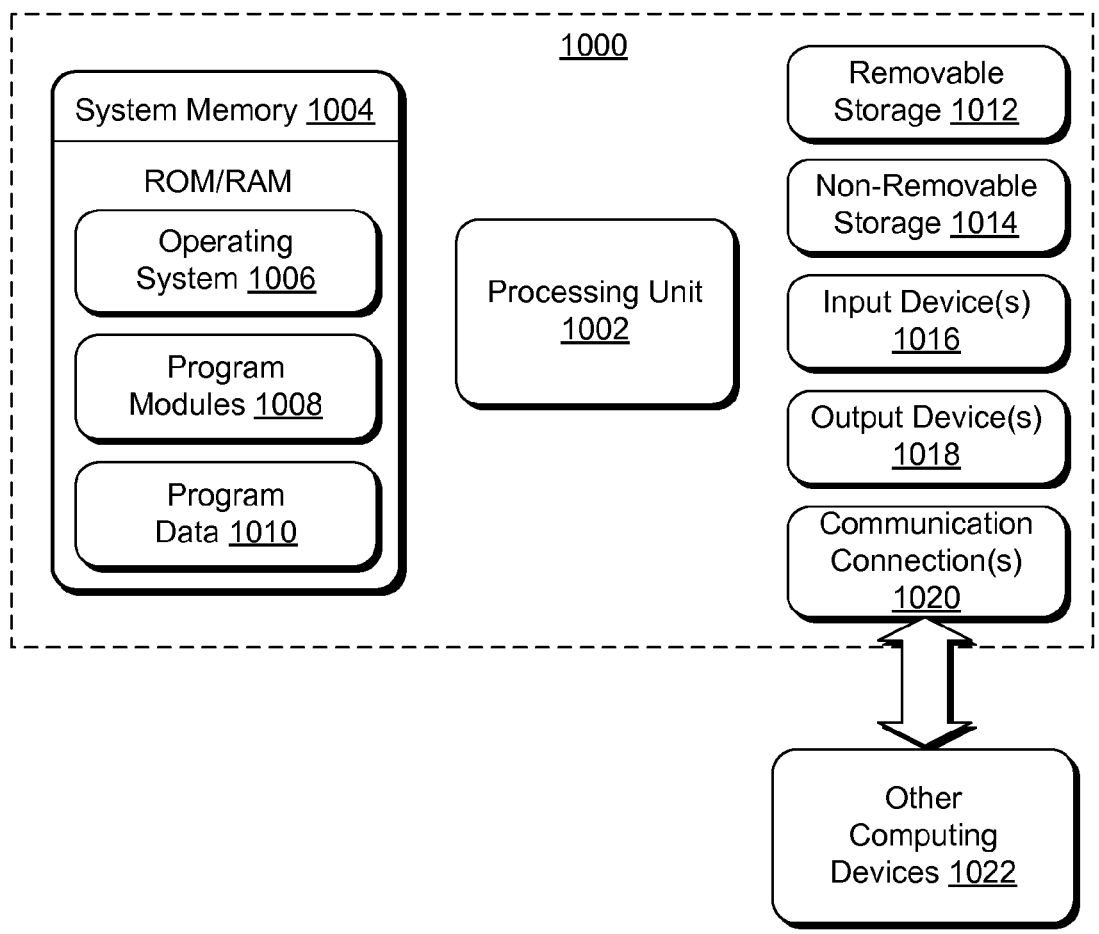
FIG. 10 illustrates a block diagram showing components of a computer system implementing a server, client, or metadata server, in accordance with various embodiments.
Figure 11:
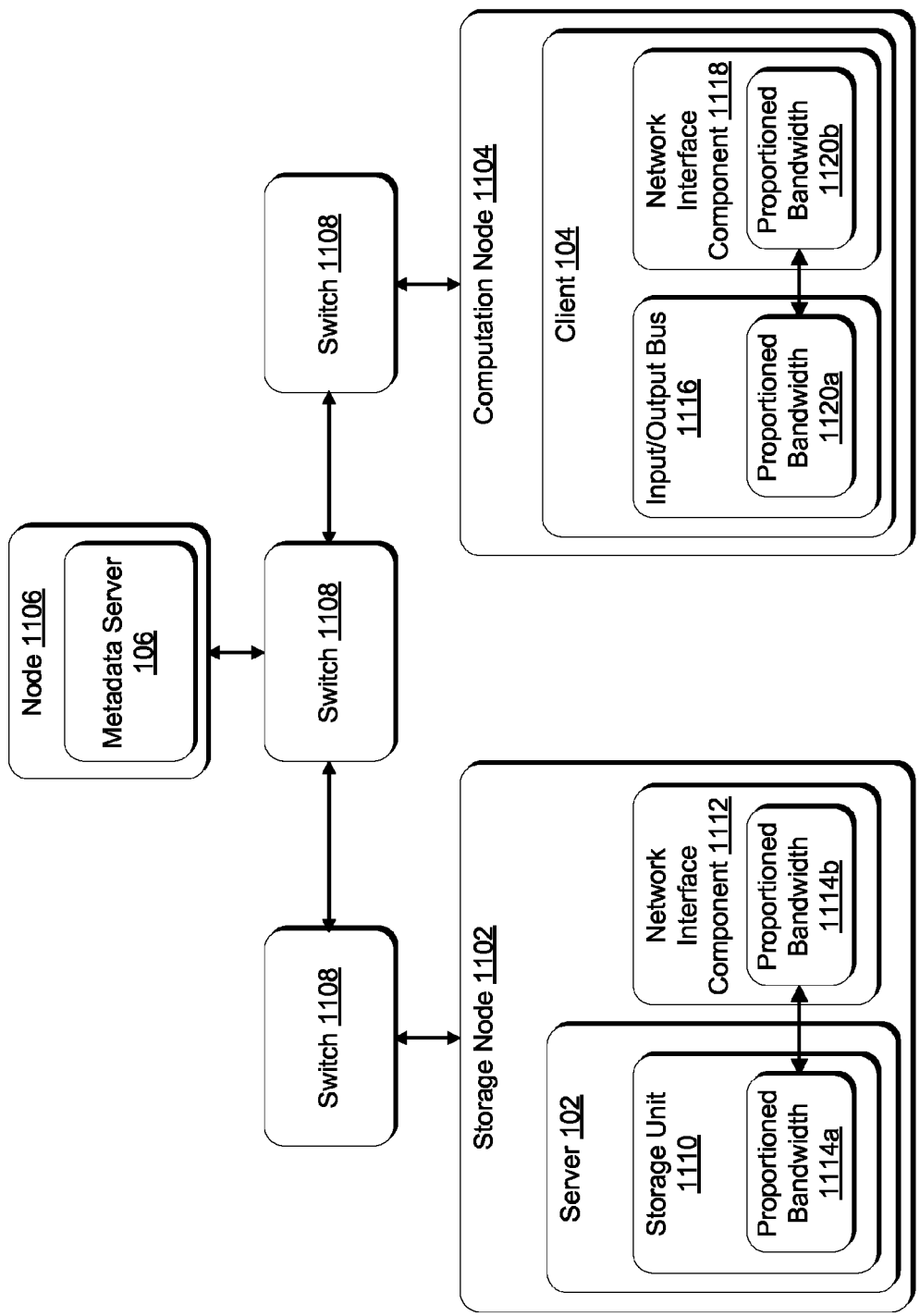
FIG. 11 illustrates a block diagram showing an example implementation in nodes of a datacenter having proportioned bandwidths, in accordance with various embodiments.

In various embodiments, each of the servers 102, the client 104, and the metadata server 106 is implemented in a separate computing device. The computing device may be any sort of computing device, such as a personal computer (PC), a laptop computer, a workstation, a server system, a mainframe, or any other computing device. In one embodiment, one of the servers 102, client 104, and metadata server 106 is a virtual machine located on a computing device with other systems. In some embodiments, rather than implementing each server 102, client 104, and metadata server 106 on a separate computing device, two or more of the server 102, client 104, and metadata server 106 are implemented on a shared computing device, as separate virtual machines or otherwise. For example, a server 102 and metadata server 106 could be implemented on a single computing device. Also, multiple ones of the servers 102 may be implemented on a single computing device, with one server 102 for each storage unit memory 110 of the computing device. Thus, if a single computing device includes both storage unit memory 110a and storage unit memory 110b, that computing device would implement both server 102a and server 102b. Example computing devices implementing the servers 102, client 104, and metadata server 106 are illustrated in FIGS. 10 and 11 and are described in greater detail below with reference to those figures.

In some embodiments, the computing devices implementing the servers 102, client 104, and metadata server 106 are connected by one or more switches (not shown). These switches can also comprise one or more networks, such as wide area networks (WANs), local area networks (LANs), or personal area networks (PANs). The network may also be a private network such as a network specific to a datacenter. In such an implementation, the switches comprise or are connected to routers and/or devices acting as bridges between data networks. Communications between the computing devices through the switches and routers may utilize any sort of communication protocol known in the art for sending and receiving messages, such as the Transmission Control Protocol/Internet Protocol (TCP/IP) and/or the Uniform Datagram Protocol (UDP).

In various embodiments, as mentioned above, each server 102 may include a locator table 108 received from the metadata server 106. The locator table 108 includes entries for representations associated with tract identifiers and servers 102 associated with each representation. For example, each row in the locator table 108 may be one entry, including a representation and the servers 102 associated with that representation. The locator table 108 could then include a column for representations and a column for servers 102. Each representation may be a bit pattern of a determined bit length (such as a length of three). The number of representations and thus the number of entries is a function of that bit length, with one representation for each possible bit pattern. Thus, if the bit length of each representation is three, there will be eight representations and eight entries in the locator table 108. In one embodiment, the locator table 108 includes additional entries that are specific to tracts where the representations are the full translations of the tract identifiers. Such additional entries may be included for frequently accessed tracts. In other embodiments, rather than storing the entire locator table 108, each server 102 stores only the representations that it has been associated with by the locator table 108. For instance, if server 102a has been associated with the representations "000," "011," and "110," server 102a would store only those representations rather than the entire locator table 108. The servers 102 obtain their associated representations by querying the metadata server 106 for those representations. In some embodiments, the locator table 108 or representations are stored in the storage unit memories 110 of the servers 102 or in other memories, such as caches or random access memories (RAM) of the computing devices implementing the servers 102. Further details regarding the locator table 108 are included in the following description, and an example locator table 108 is illustrated in FIG. 2 and is described with reference to that figure.

Figure 3:
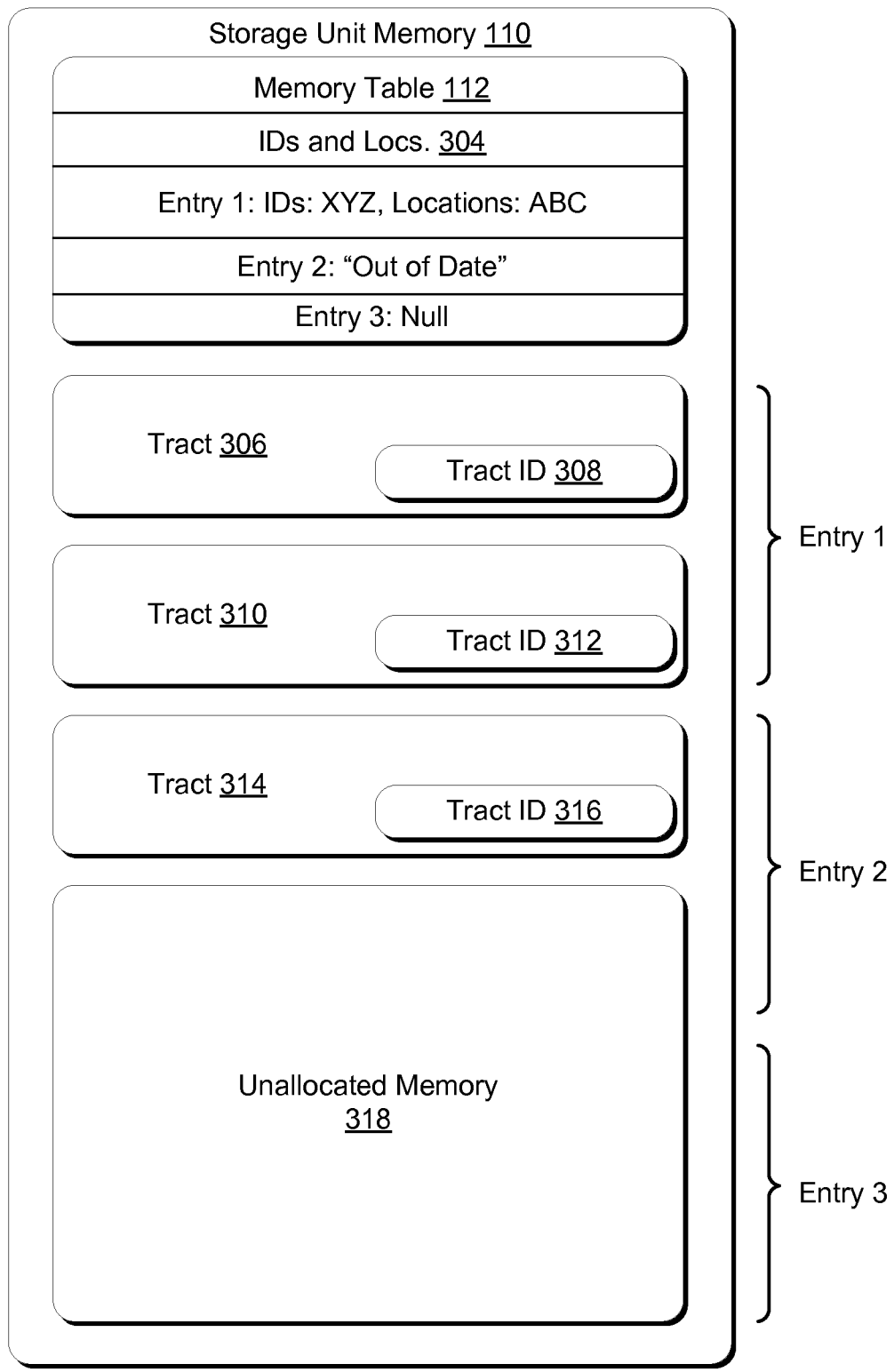
FIG. 3 illustrates a block diagram showing an example server memory architecture, in accordance with various embodiments.

In addition to the locator table 108 or representations, each server 102 includes a storage unit memory 110. The storage unit memory 110 could be any sort of storage component, such as a disk drive, a permanent storage drive, random access memory, an electrically erasable programmable read-only memory, a Flash Memory, a miniature hard drive, a memory card, a compact disc (CD), a digital versatile disk (DVD), an optical storage drive, a magnetic cassette, a magnetic tape, or a magnetic disk storage. Each storage unit memory 110 includes a memory table 112 storing identifiers of the tracts stored in the storage unit memory 110 and locations where those tracts are stored. Such a memory table 112 is illustrated in FIG. 3 and is described in greater detail with reference to that figure.

In various embodiments, each storage unit memory 110 stores tracts of data from multiple byte sequences. For example, storage unit memory 110*a* stores the first tract from each of three byte sequences, including sequence-1 tract-1 114, sequence-2, tract-1 116, and sequence-3 tract-1 118. Storage unit memory 110*b* stores the second tract from the three sequences, including sequence-1 tract-2 120, sequence-2, tract-2 122, and sequence-3 tract-2 124. Storage unit memory 110*c* stores the third tract from the three sequences, including sequence-1 tract-3 126, sequence-2, tract-3 128, and sequence-3 tract-3 130. Each tract of the tracts 114-130, as well as any other tracts stored by the storage unit memories 110, has the same length, such as a length of one megabyte, sixty-four kilobytes, or some length in-between. The storage unit memory 110 may store tracts contiguously, one after another, with the last bytes of each tract being reserved for the tract identifier. In some embodiments, the tract identifier is a combination of a byte sequence identifier and a tract sequence number indicating the place of the tract within the sequence. When the sequence number is combined with the tract size, a byte offset can be calculated for the tract. For example, the byte sequence identifier may be a globally unique identifier (GUID) and may have a one-hundred-twenty-eight bit length. The tract sequence number may be represented by sixty-four bits, creating a one-hundred-ninety-two bit length tract identifier. In other embodiments, rather than storing the tract identifier, the storage unit memory stores a hash of the tract identifier or some other translation to a fixed length. Such a hash/translation may have a short length than the tract identifier, such as a length of one-hundred-sixty bits. The storage unit memory 110 is illustrated in FIG. 3 and is described in greater detail with reference to that figure.

In addition to the components shown in FIG. 1, each server 102 may include logic enabling the server to read from and write to its storage unit memory 110, to construct and update its memory table 112, to acquire the locator table 108 or the representations with which it is associated in the locator table 108, to provide the locator table 108 to client 104, and to determine if failure is imminent and to notify 148 the metadata server 106 of the imminent failure. The logic may acquire the locator table 108 as part of a locator table invalidation process. Such logic may include processes, threads, or routines and may be stored in the storage unit memory 110 or in additional memory, such as cache memory or RAM, of the computing device implementing the server 102. Operations performed by such logic are described in greater detail below.

As illustrated in FIG. 1 and mentioned above, the metadata server 106 includes a distribution module 132. The distribution module 132 generates and updates the locator table 108. In some embodiments, generating the locator table 108 includes selecting a bit length of the representation. The distribution module 132 performs this selecting based at least in part on the number of servers 102. The distribution module 132 further determines the of the locator table 108 based at least in part of the number of servers 102. For example, if there are eight servers 102, the distribution module 132 could select a bit length of three. After selecting the length, the distribution module 132 generates a locator table 108 with an entry for each possible representation, associating multiple servers 102 with each possible representation to ensure redundancy. In some embodiments, the metadata server 106 ascertains or is programmed with the knowledge that one of the tracts stored by one of the servers 102 is frequently accessed. The metadata server 106 adds an entry to the locator table 108 for that tract, including as the representation the full translation of the tract's identifier. In one embodiment, the locator table 108 accommodates the inclusion of new tracts without requiring a refresh or update of the locator table 108. Because the locator table 108 includes all possible representations, there is no need to update the locator table 108 in response to the creation of a new tract, as that new tract will correspond to one of those possible representations.

Figure 6:
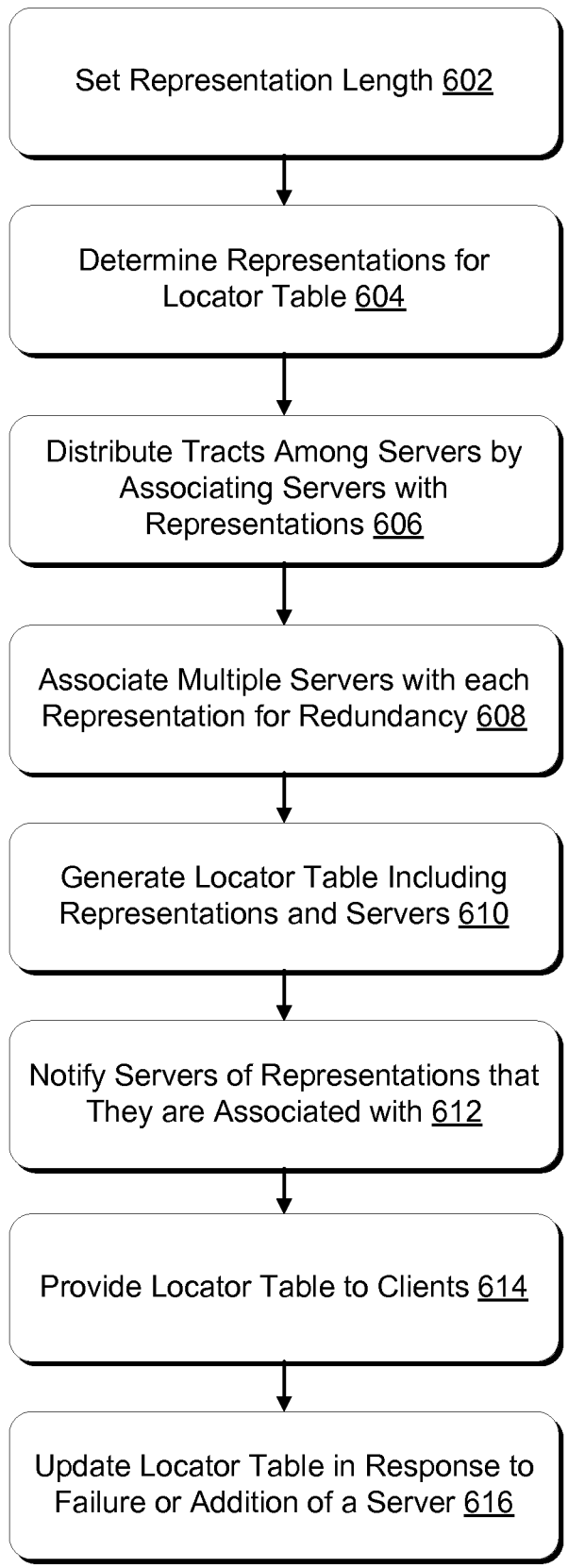
FIG. 6 illustrates a flowchart showing techniques for generating a locator table, in accordance with various embodiments.

The distribution module 132 then updates the locator table 108 upon detecting the failure of a server 102, the addition of a new server 102, or to re-balance the load between the servers 102. The generated or updated locator table 108 is then provided to the client 104 and, in some embodiments, to the servers 102. The locator table 108 can be transmitted in any format recognizable by the client 104 and servers 102. In other embodiments, the distribution module 132 processes requests for representations associated with a given server 102 and provides those associated representations to that server 102. In various embodiments, the distribution module 132 includes processes, threads, or routines. The operations of the distribution module 132 are illustrated in FIG. 6 and are described further below in reference to that figure.

Figure 7:
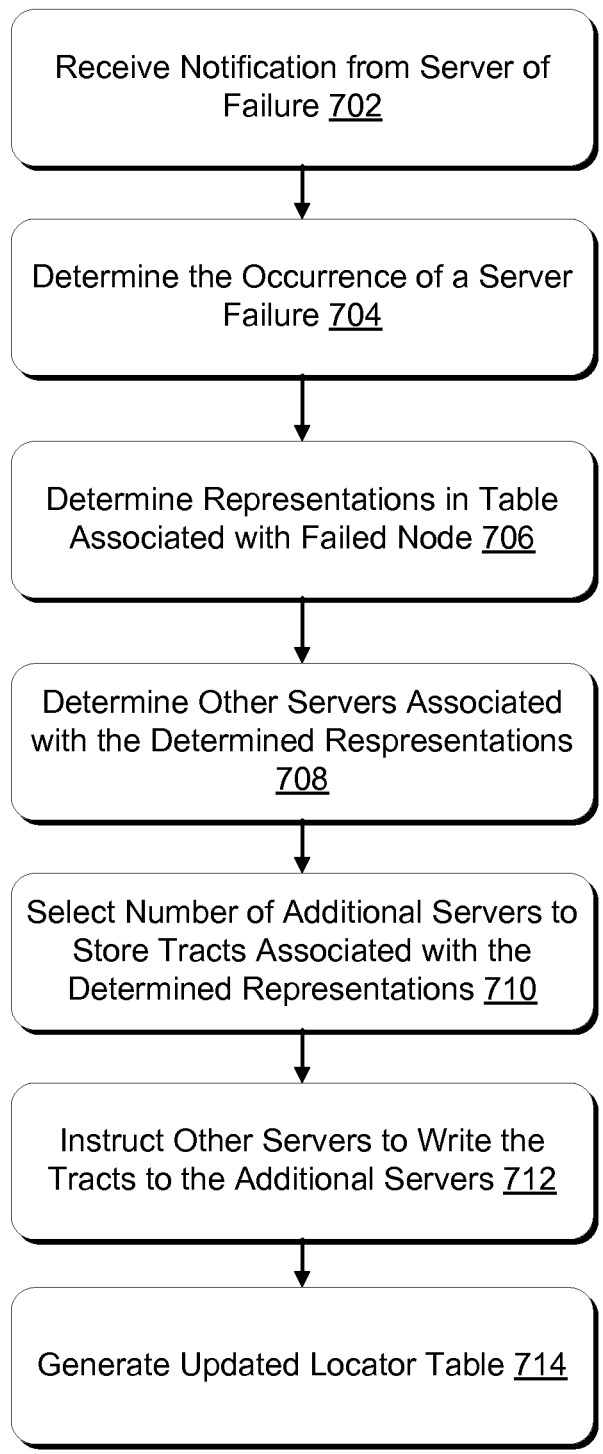
FIG. 7 illustrates a flowchart showing techniques for determining other servers storing tracts that are also stored on a failed server and for instructing those other servers to provide the tracts to additional servers, in accordance with various embodiments.

In various embodiments, the metadata server 106 also includes a recovery module 134 to manage recovery in response to a failure of a server 102. The recovery module 134 processes notifications 148 received from a server 102 that has failed or is about to fail. In response to processing a notification 148 or detecting a failure in some other manner, the recovery module 134 determines the representations associated with the failing server 102 by examining the locator table 108. The recovery module 134 then also determines other servers 102 associated with those representations and instructs at least one of the other servers 102 per representation to write tracts associated with those representations to additional servers 102. The additional servers 102 may be unutilized servers 102 or servers 102 currently associated with different representations. In various embodiments, the recovery module 134 includes processes, threads, or routines. The operations of the recovery module 134 are illustrated in FIG. 7 and are described further below in reference to that figure.

As illustrated in FIG. 1, the metadata server 106 stores the locator table 108 after generating or updating the locator table 108. By storing the locator table 108, the metadata server 106 is enabled to provide the locator table 108 to requesting clients 104 and to use the locator table 108 in recovery operations. The metadata server 106 may also provide the locator table 108 to servers 102 as part of a locator table invalidation process to enable more efficient distribution of an updated locator table 108

Turning now to the client 104, the client 104 is shown as including a file system interface 136. The file system interface 136 is a process, thread, or routine capable of representing a byte sequence as a file to be requested by a user or an application, such as application 138. In some embodiments, the file system interface 136 is a part of an operating system (OS) of the computing device implementing the client 104. The file system interface 136 may further present a file system structure, such as a hierarchy of folders storing files. The user or application 138 interacts with the byte sequences as it would interact with files or other known data structures. The file system interface 136 maps or translates a requested file to a byte sequence. To do so, the file system interface 136 may make use of a table or other structure storing a mapping of a file name to a byte sequence identifier, such as the byte sequence GUID described above. In other embodiments, the file system interface 136 requests a byte sequence identifier from a central store, the central store located on the computing device implementing the client 104 or on some other computing device.

The application 138 is any sort of application. For example, the application 138 may be a word processing service or a process, thread, or routine of such a service. The application 138 interacts with the other components of the client 104 as it would interact with an OS and components of any computing device. As mentioned above, the application 138 makes a request related to a file, such as a read or write request. The request is received by the file system interface 136, and mapped or translated into a request for a byte sequence. In other embodiments, the client 104 does not include a file system interface 136 and the application 138 is configured to request a byte sequence rather than a file.

Figure 4:
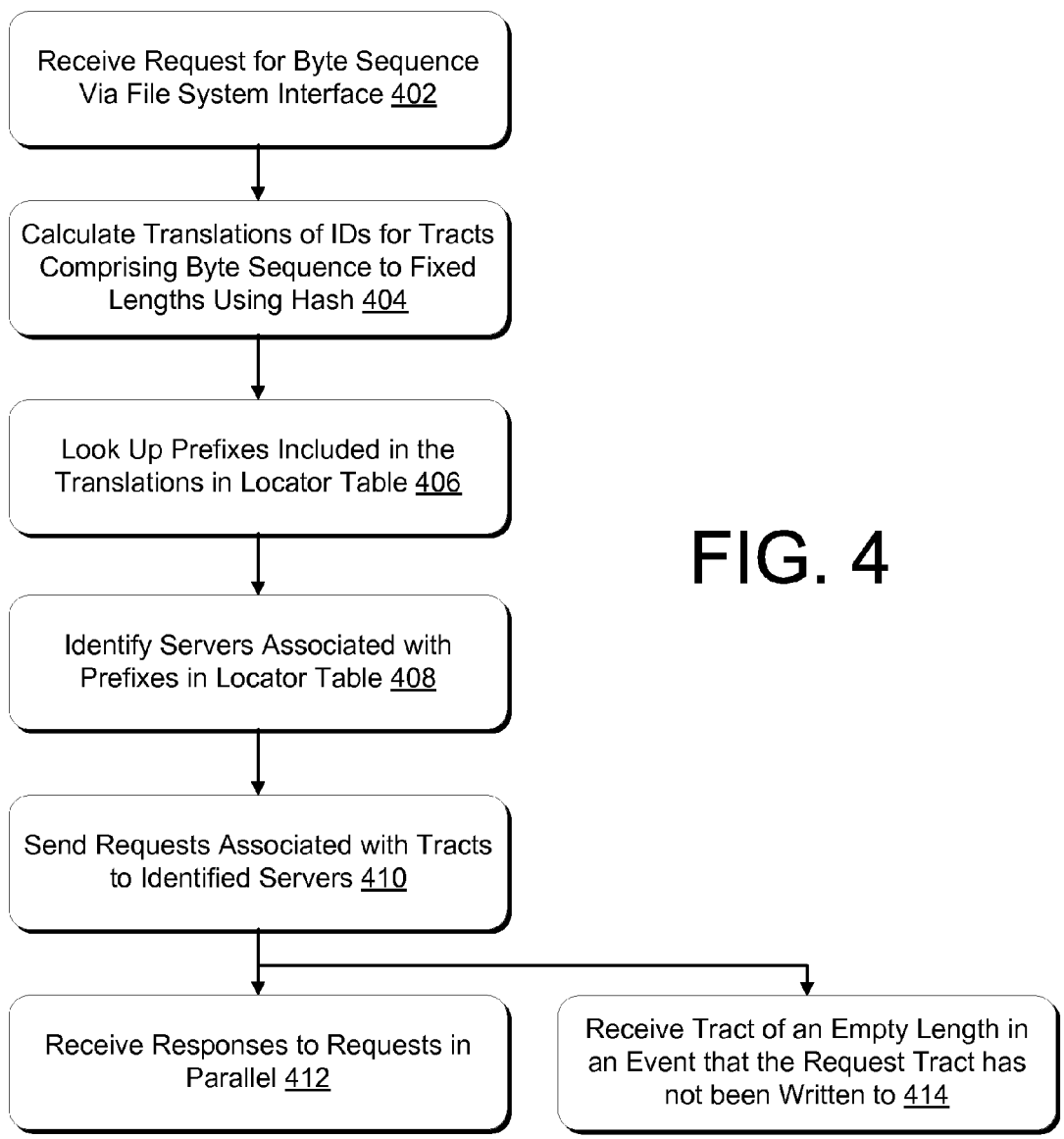
FIG. 4 illustrates a flowchart showing techniques for identifying a server associated with a tract and for providing a request associated with that tract to the identified server, in accordance with various embodiments.
Figure 5:
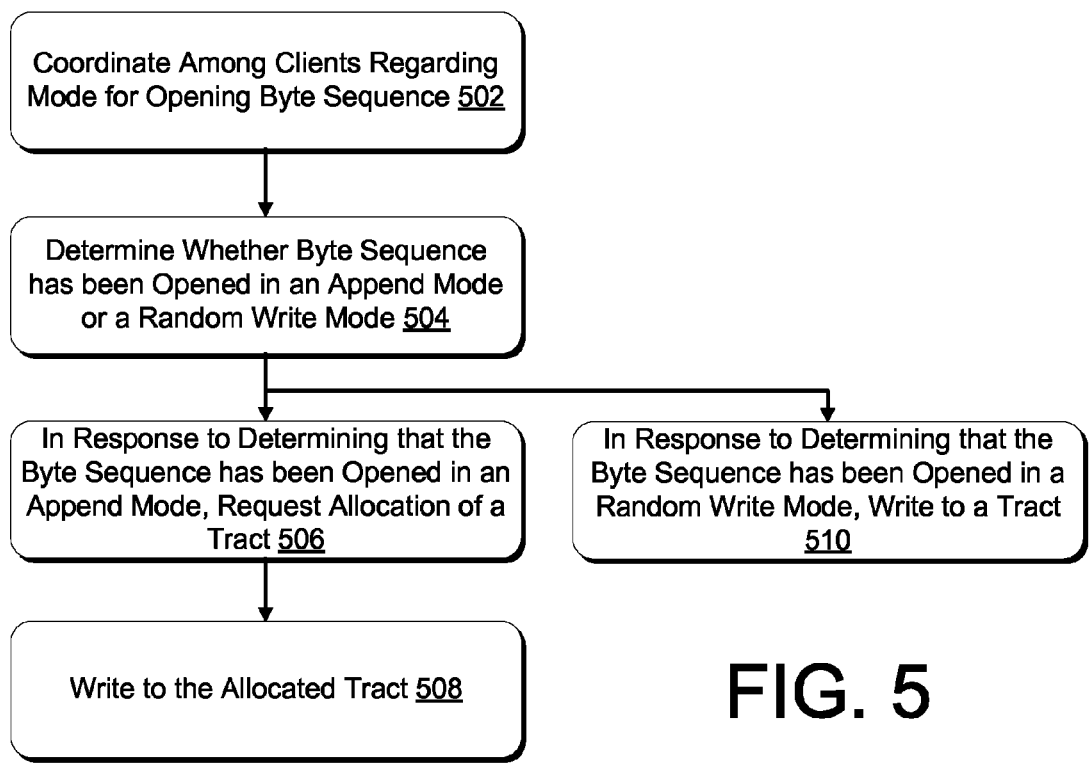
FIG. 5 illustrates a flowchart showing techniques for determining the mode in which a byte sequence has been opened and for performing a write request based on that determination, in accordance with various embodiments.

In some embodiments, the client library 140 is a component configured to be utilized by other processes, threads, or routines, such as a dynamic link library. The client library 140 may be utilized by the file system interface 136, by the application 138, or by the OS of the computing device implementing the client 104. The client library provides interfaces to the file system interface 136, the application 138, or the OS, such as application programming interfaces (APIs), and performs actions based on requests received at those interfaces. When the client library 140 receives a request for a byte sequence, it identifies servers 102 associated with tracts comprising that byte sequence by referencing the locator table 108. In some embodiments, the client library 140 also determines whether the requested byte sequence has been opened in an append mode or a random write mode. If the byte sequence has been opened in an append mode, the client library send a request for allocation of a tract. The client library then provides a read or write request to the identified server 102 and receives the response 144. In some embodiments, the client library 140 sends multiple requests 142 to multiple servers 102 associated with the multiple tracts comprising a requested byte sequence. In return, the client library 140 receives multiple responses 144 simultaneously or substantially simultaneously. These and other operations of the client library 140 are illustrated in FIGS. 4 and 5 and are described further below in reference to those figures.

As illustrated in FIG. 1, the computing device implementing the client 104 stores the locator table 108. The client 104 receives 146 the locator table 108 from the metadata server 106 when the metadata server 106 generates the locator table 108. In some embodiments, the client library 140 is configured to request the locator table 108 from the metadata server 106, from a server 102 or from another client 104 in response to an event such as a failure or reboot of the client 104.

Example Locator Table

FIG. 2 illustrates a block diagram showing an example locator table 108, in accordance with various embodiments. As illustrated, a locator table 108 includes a column 202 for representations and a column 204 for servers 102. Each row of the locator table 108 includes a representation and multiple servers 102 associated with that representation. Each representation in column 202 is a bit pattern with a length of four, with the exception of the last representation shown in column 202. The last representation is a full translation of a tract identifier. Thus, while shown as eight bits, the representation may be one-hundred-sixty bits. The full translation may be used in association with "heavily utilized" tracts (e.g., tracts that are frequently read from), allowing that tract to be associated with its own set of servers 102. As mentioned above, column 202 includes every possible bit pattern with a length of four. The servers 102 in column 204 comprise server identifiers, such as Internet Protocol (IP) addresses of each server 102. Thus, in the first row of column 204, the servers "A, B, C" correspond to three server IP addresses. Each of those servers "A, B, C" are associated with tracts that are in turn associated with the representation "0000" via translations to fixed lengths of tract identifiers. Prefixes included in the translations also comprise bit patterns with a length of four bits and are matched to the representations in the locator table 108.

In various embodiments, the locator table 108 also includes a locator table version number 206, such as a sixty-four bit number. Each time a new locator table 108 is generated or updated, the metadata server 106 increments the version number 206 and stores the incremented version number 206 in the new locator table 108. The version number 206 enables clients 104 and servers 102 receiving a new locator table 108 to determine whether they have the most recent locator table 108. The version number 206 also enables the metadata server 106 to determine whether a requesting client 104 or server 102 has the most recent locator table 108, as such requests include the version number of the locator table 108 stored on the client 104 or server 102. For example, if a client 104 requests a locator table 108 from a server 102 or other client 104, it is possible that the locator table the client 104 receives will not be as up-to-date as a locator table 108 that the client 104 already has. The client can ascertain which locator table 108 is most up-to-date simply by comparing version numbers 206.

Example Server Memory Architecture

FIG. 3 illustrates a block diagram showing an example server memory architecture, in accordance with various embodiments. As illustrated, a storage unit memory 110 of a server 102 includes a memory table 112, the memory table 112 storing identifier and location entries 304 for tracts stored in the storage unit memory 110. The memory table 112 may include a single column for both the identifiers and locations (as shown) or may include a column for identifiers and a column for locations. In some embodiments, the memory table 112 includes a row for each tract stored in the storage unit memory 110. In other embodiments, the memory table 112 includes a single row for a group of tracts stored in the storage unit memory 110 (e.g., ten tracts). Each row can store one or more identifiers and one or more locations, an "out of date" flag, or a null value. In other embodiments, the column shown in FIG. 3 is a row and the rows are columns.

In various embodiments, the memory table 112 is stored in a reserved part of the storage unit memory 110, such as the "start" or the "end" of the storage unit memory 110, the "start" and "end" corresponding to the lowest or highest byte locations within the storage unit memory 110. The memory table 112 has a known size, such as ten megabytes, thus enabling the server 102 to scan the tract identifiers in the storage unit memory 110 without scanning the memory table 112.

Figure 8:
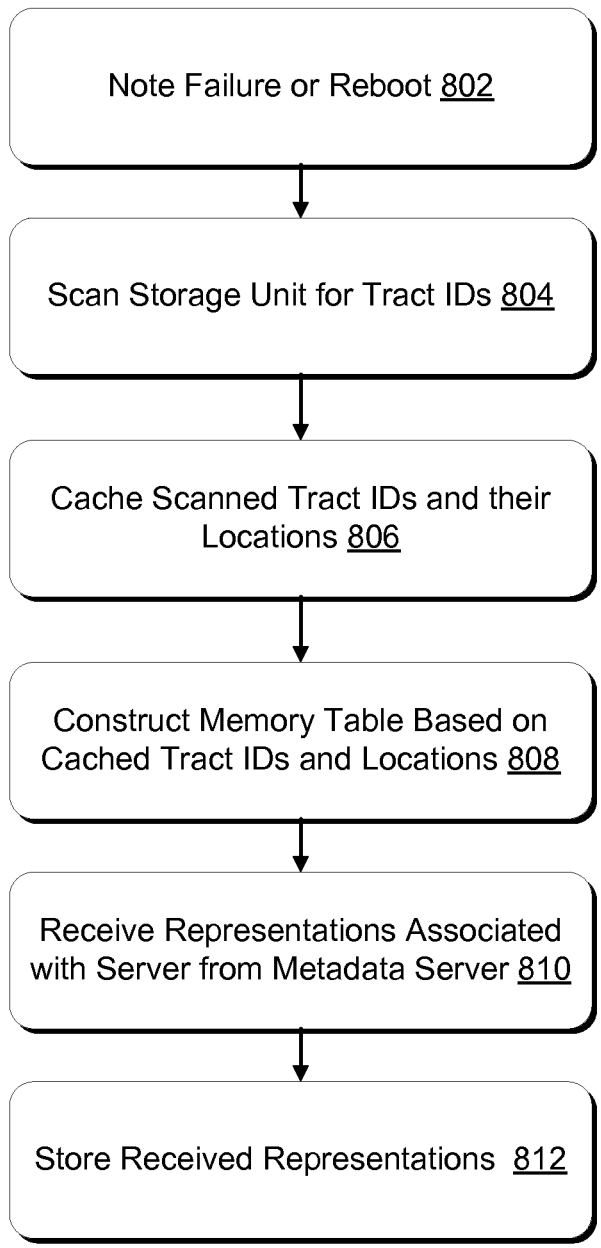
FIG. 8 illustrates a flowchart showing techniques for scanning server storage for tract identifiers and for constructing a table of tract identifiers and tract locations based on the scan, in accordance with various embodiments.
Figure 9:
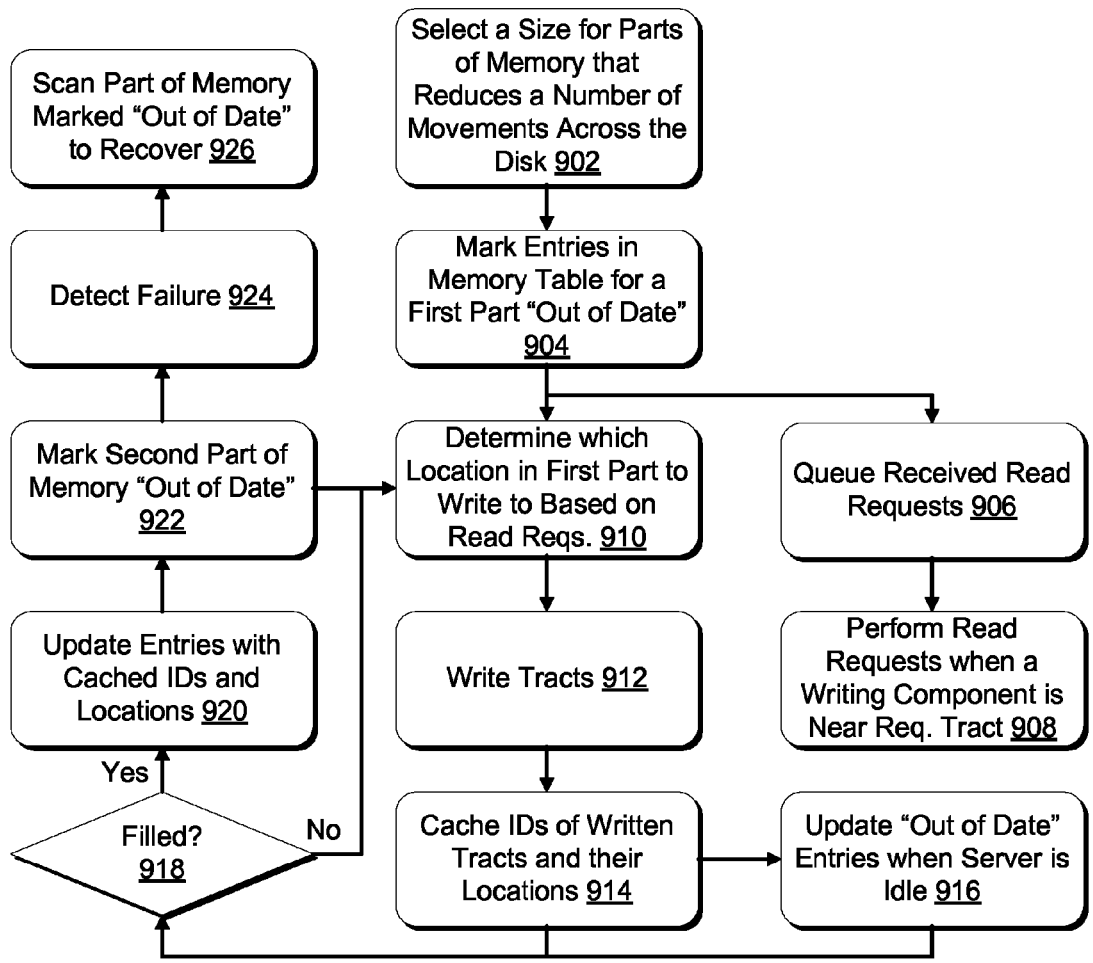
FIG. 9 illustrates a flowchart showing techniques for updating a server memory table based on a partial scan of server storage, in accordance with various embodiments.

As mentioned above, when the memory table 112 is initially generated, one or more entries 304 for tracts are marked "out of date." Once the tracts corresponding to those one or more entries 304 are written to, their identifiers and locations are stored in the entries 304 and an additional one or more entries 304 are marked "out of date." Other available entries 304 in the memory table 112 are set to "null." In one embodiment, the number of entries 304 available in the memory table 112 is proportioned to the number of tracts the storage unit memory 110 is capable of storing. In some embodiments, the memory table 112 is constructed by scanning the tract identifiers stored in the storage unit memory 110. Because the tracts each have a same size (e.g., one megabyte) and the tract identifiers each have a same size (e.g., one-hundred-ninety-two bits), the server 102 can scan only the tract identifiers, thus more efficiently scanning the storage unit memory 110. The constructing and updating of the memory table 112 are illustrated in FIGS. 8 and 9 and are described further herein in reference to those figures.

As is further shown in FIG. 3, the storage unit memory 110 also stores tracts 306, 310, and 314 and tract identifiers 308, 312, and 316. Tract identifier 308 identifies tract 306, tract identifier 312 identifies tract 310, and tract identifier 316 identifies tract 314. Each tract identifier may be stored within the memory allocated for its corresponding tract (as shown) or may be stored contiguously with a tract, following it or preceding it. If stored within the memory allocated for its tract, the tract identifier may be stored at the beginning or end of the allocated memory. In addition to tracts and identifiers 306-316, the storage unit memory also includes unallocated memory 318.

In FIG. 3, each entry 304 corresponds to two tracts. The first entry 304 stores identifiers "XYZ" (corresponding to identifiers 308 and 312) for the first two tracts—tracts 306 and 310—and locations "ABC" for the first two tracts. The second entry 304 is marked "out of date" because the second entry 304 is to store the third and fourth tracts, but only the third tract—tract 314—has been written. The third entry 304 is set to null because the second entry 304 has not been updated with identifiers and locations.

Example Server Identification Techniques

FIG. 4 illustrates a flowchart showing techniques for identifying a server 102 associated with a tract and for providing a request 142 associated with that tract to the identified server 102, in accordance with various embodiments. In various embodiments, the operations shown in FIG. 4 are performed by the client 104 and some, more specifically, by the client library 140 of the client 104. In some embodiments, the file system interface 136 of the client 104 first receives a request for a file or other representation of a byte sequence from an application 138 or user. The file system interface 136 than translates the request for the file or structure to a request for a byte sequence. As discussed above, the translation to a byte sequence request may involve reference to a table or some other data structure storing mappings between files and byte sequences. Or, in other embodiments, the translation may involve the file system interface 136 transmitting the file name or identifier to a data store and receiving, in return, a byte sequence identifier, such as a byte sequence GUID.

At block 402, the client library 140 is invoked to receive the request for the byte sequence from the file system interface 136. The request includes the byte sequence identifier, a designation as to whether the request is to be a read or write request, and, if a write request, the data to be written. Also, the request may include information about the byte sequence, such as a size of the byte sequence. In one embodiment, the client library 140 receives the request via an interface of the client library 140 that was invoked by the file system interface 136.

At block 404, the client library 140 calculates translations of tract identifiers for one or more of the tracts comprising the byte sequence to fixed lengths. If the request received via the file system interface 136 is a read request, the client library 140 calculates translations of tract identifiers for each tract comprising a byte sequence. If the request received via the file system interface 136 is a write request, however, then the client library identifies a tract or tracts to write to and calculates translations of tract identifiers for those identified tracts. The identifying of tracts to write to is described further below in reference to FIG. 5.

In some embodiments, the calculating makes use of a hash algorithm, such as a SHA-1 hash algorithm, in translating the tract identifiers. As mentioned above, each tract identifier includes the byte sequence identifier and a tract sequence number. In one embodiment, the tract identifiers are generated by the client library 140 based on the specified tract size and the size of the byte sequence. For example, if each tract is one megabyte and the byte sequence is forty megabytes, the client library generates forty tract identifiers for the forty tracts that make up the byte sequence. As also mentioned above, the byte sequence identifier portion of each tract identifier is one-hundred-twenty-eight bits and the tract sequence number is sixty-four bits, combining to form a one-hundred-ninety-two bit tract identifier. Each hash or translation of a tract identifier may be a shorter length, such as one-hundred-sixty bits. One result of the calculation is that the translations for two very similar tract identifiers (e.g., the identifiers for the first and second tracts in a byte sequence) are very different from one another. While the first one-hundred-twenty-eight bits of two sequential tract identifiers are the same, the first two, three, or four bits of the translations of those tract identifiers are likely to be different from one another.

At block 406, the client library 140 then looks up prefixes included in the translations in the locator table 108. As described above, the locator table 108 distributes the tracts among the plurality of servers 102. Because the locator table 108 associates servers 102 based on the first bits of a translation of a tract identifier and because any two sequential tracts have different first bits of in their translated tract identifiers, those two sequential tracts are associated with different servers 102.

In various embodiments, the client library 140 compares each translation to representations stored in the locator table 108, such as the representations in column 202 of FIG. 2. Because the representations may have a smaller bit length than the translations, the client library 140 may determine the length of the representations and determine the first N bits of each translation, N being the determined length of the representations. These first N bits are referred to herein as a "prefix" that is included in a translation. The client library 140 looks up these prefixes in the locator table 108 and notes the servers 102 associated with each prefix.

At block 408, the client library identifies a server 102. Among the noted servers 102 for each prefix, the client library 140 identifies a server 102 to which the client library 140 will transmit a request 142 for a corresponding tract. For example, if servers A, B, and C are associated with a prefix, the client library 140 may select A as the identified server 102, since the server A is listed first. In some embodiments, the client library 140 looks up and identifies a server 102 for each tract of the requested byte sequence. Also, in some embodiments, after identifying a server 102, the client library 140 uses the server identifier included in the locator table 108 to retrieve additional information about the server 102 that may have been provided with the locator table 108, such as a port that the server 102 is listening on for requests 142.

At block 410, the client library 140 next transmits the requests 142 associated with the tracts to the identified servers 102. The client library 140 may transmit the requests 142 one after another, as each server 102 is identified, or may wait until all servers 102 have been identified and then transmit all of the requests 142 simultaneously. Each request 142 identifies the server 102 that it is being sent to (e.g., via an IP address of the server 102), whether the request 142 is a read request or a write request, the tract identifier associated with the request 142, the version number 206 of the locator table 108, and if the request is a write request, the data to be written to the tract. In some embodiments, the transmission may include encapsulating the request 142 in a packet, such as a TCP/IP packet or a UDP packet, and transmitting the request 142 across a network.

At block 412, the client library 140 receives responses 144 to the requests 142 in parallel. Because the client library 140 may transmit multiple requests 142 to multiple servers 102, responses 144 to those requests 142 may be received at substantially the same time. The responses 144 may provide a requested tract, provide an indication of whether a write operation was successful, provide notification that a requested tract is not stored by the server 102, or include an updated locator table 108 having a more recent version number 206 than the version number 206 that was included in the request 142. If the response 144 indicates that the requested tract is not stored by the server 102, the client library 140 identifies another server 102 to which the client library 140 will transmit the request 142. For example, the client library 140 may have looked up servers A, B, and C for the tract, identified server A and transmitted the request 142 to server A. If the response 144 indicated that server A did not have the tract, then the client library 140 may identify server B and transmit the request to server B. If none of the servers 102 have the tract, then the client library 140 requests an updated locator table 108 from the metadata server 106. Upon receiving the updated locator table 108, the client library 140 repeats the operations illustrated at blocks 406-412 for the unlocated tract.

At block 414, the client library 140 may receive 414 a tract of an empty length in response 144 to a request for an unwritten-to tract. If a server 102 determines that it is associated with a tract but the tract has not been written to, the server 102 returns a tract of an empty length in response to a read request.

Upon receiving a response 144, the client library 140 may in turn respond to the file system interface 136. If the request received from the file system interface 136 was a read request, the client library 140 may respond with all the tracts for a byte sequence. If the request received from the file system interface 136 was a write request, the client library 140 may respond with an indication of whether the write operation was successful.

Example Mode Determination Techniques

FIG. 5 illustrates a flowchart showing techniques for determining the mode in which a byte sequence has been opened and for performing a write request based on that determination, in accordance with various embodiments. At block 502, a client library 140 having received a write request, such as a write request received from a file system interface 136, coordinates with other clients 104 regarding which mode to open a byte sequence in. Because multiple clients 104 may write to a byte sequence at the same time, they may all make use of a common locking mechanism or memory allocation mechanism. Such mechanisms include a locking mechanism associated with random write operations and a memory allocation mechanism associated with append operations. In some embodiments, the coordination involves having the client 104 creating a byte sequence determine the mode in which the byte sequence is to be opened. In other embodiments, each client 104 requests that the byte sequence be open in a given mode and a device receiving those requests may select the mode specified in the first request received for opening a byte sequence. Such a device may be another server or computing device of the datacenter, or a server or device external to the datacenter. In one embodiment, when no requests are pending for a byte sequence, the byte sequence is closed. Such a byte sequence may be opened in sequence in a random write mode followed by an append mode or visa versa.

At block 504, the client library 140 next determines whether the byte sequence has been opened in an append mode or a random write mode. If the byte sequence is new, the client library 140 may simply select the mode. Otherwise, the client library 140 determines the mode in which the byte sequence has been opened by querying a server or computing device. This may be the same server or computing device as the one performing the coordinating or may be a different server or computing device. The client library then receives a response to the query indicating whether the byte sequence is opened in an append mode or a random write mode.

At block 506, in response to determining that the byte sequence has been opened in append mode, the client library 140 requests allocation of the next available tract in the byte sequence, which may or may not be the last tract in the byte sequence. In some embodiments, the same server or computing device that coordinates how a byte sequence is opened allocates tracts for the byte sequence. Such a server or computing device may store a mode for each byte sequence and a count of the tracts already allocated for that byte sequence. For example, if a client library 140 requests a tract and six tracts have been allocated, the server or computing device may allocate the seventh tract in response to the request. The server or computing device does not check whether the client library 140 transmits the write request 142 for the allocated tract, however, which may result in a number of the allocated tracts being empty. Once the client library 140 has been allocated a tract, the client library 140 performs the calculating, looking up, and identifying described above. The client library 140 then transmits the data to be written to the tract to the identified server 102, and, at block 508, the identified server 102 writes the data to the allocated tract.

In response to determining that the byte sequence has been opened in random write mode, the client library 140 first queries the same server or computing device that coordinates how a byte sequence is opened to determine which tract is the next available tract. The server of computing device may keep a count of the tracts that have been written to. At block 510, the client library 140 then attempts to write data to the tract. This may involve performing the calculating, looking up, identifying, and transmitting described above. In some embodiments, the identified server 102, upon receiving a write request 142 for a tract, checks the memory table 112 for the tract. If no tract identifier for the tract is in the memory table 112, the identified server 102 applies a locking mechanism to enable the write to proceed. If the memory table 112 does include the tract identifier or if the tract is subject to a locking mechanism, the server 102 responds 144 to the client library 140 informing the client library 140 that the tract cannot be written to. The client library 140 then proceeds to query the server or computing device for the next tract and repeats the operations associated with the writing.

Example Table Generation Techniques

FIG. 6 illustrates a flowchart showing techniques for generating a locator table 108, in accordance with various embodiments. At block 602, the metadata server 106 first sets the length of the representations to include in the locator table 108. Each representation is a bit pattern, and the length of these bit patterns is determined based at least in part on the number of servers 102. For example, the metadata server 106 may define some function relating the number of servers 102 to a bit length.

At block 604, the metadata server 106 determines the representations to include in the locator table 108. As mentioned above, the metadata server 106 includes each possible combination of bits of a given length (the length set by the metadata server 106) in the locator table 108. To calculate the number of representations, the metadata server 106 utilizes the function $2^N$, where N is the length set by the metadata server 106. For example, if the length is three, the metadata server 106 will determine that eight representations should be included in the locator table 108 and that those representations will be 000, 001, 010, 011, 100, 101, 110, and 111. In one embodiment, the size of the locator table is based at least in part on the number of available servers.

In addition to those representations, the metadata server 106 determines if any frequently access tracts should be associated with their own sets of server 102. If so, the metadata server 106 retrieves the tract identifiers for those tracts and calculates the translations of the tract identifiers. The metadata server 106 then includes the full translations as representations to be associated with servers 102.

At block 606, the metadata server 106 effects a distribution of tracts among servers 102 by associating the servers 102 with the representations. In associating servers 102 with representations, the metadata server 106 determines a number of servers 102 to associate with each representation and apportions the servers 102 in some manner to the representations. For example, if the metadata server 106 determines that three servers 102 should be associated with each representation, and servers A-Z are available for assignment, the metadata server 106 may associate servers A, B, and C with a first representation, servers D, E, and F with a second representation, and so on. Once each server 102 has been associated with a representation, the metadata server 106 may "cycle" through the servers 102 again, associating each server 102 to a second representation. In some embodiments, the associating effects a distribution of the tracts among the servers by associating different representations with different servers 102. As mentioned above, each representation corresponds to a prefix included in a translation of a tract identifier. The translating is performed in such a manner that sequential tracts of a byte sequence have different prefixes. Thus, by associating the different prefixes of tracts of a byte sequence to different servers 102, the metadata server 106 ensures that the tracts of a given byte sequence are distributed among a plurality of servers 102.

At block 608, in performing the associating, the metadata server 106 associates multiple servers 102 with each representation to ensure redundancy. The number of servers 102 associated for redundancy may be a function of the number of servers available and the information security desired. The number of servers 102 may also be a function of a target recovery duration (i.e., the more servers 102 assigned to a representation, the faster the recovery in the event of server failure). In the example above, three servers 102 are associated, ensuring two copies of tracts associated with a representation are replicated in the event that one server 102 fails.

At block 610, the metadata server 106 generates the locator table 108 based on the representations and servers 102. The locator table 108 may include columns for the representations and server 102, respectively, as shown in FIG. 2. The locator table 108 may then further include a row for each representation and its associated servers 102. In other embodiments, the locator table 108 includes a row for representations, a row for servers 102, and a column for each representation and its associated servers 102. In addition to the representations and servers 102, the locator table 108 includes a version number, such as locator version number 206. In generating the locator table 108, the metadata server 106 increments the version number and includes the incremented version number in the locator table 108. The resulting locator table 108 may be represented in any format, such as a text file, an extensible markup language (XML) file, or a database file, such as a Microsoft Access® database file. In some embodiments, upon generating the locator table 108, the metadata server 106 stores the locator table 108 in memory of the computing device implementing the metadata server 106.

At block 612, the metadata server 106 then notifies servers 102 of representations that the servers 102 are associated with. The metadata server 106 may perform the notifying by transmitting the locator table 108 to the servers 102 or by looking up, for each server 102, representations associated with that server 102 in the locator table 108 and transmitting those representations to the server 102.

At block 614, the metadata server 106 provides the locator table 108 and metadata describing the servers 102 to the clients 104. Such metadata can include ports listened on by the servers 102. The clients 104 may each be registered with the metadata server 106, thereby informing the metadata server 106 of their identities. In other embodiments, the metadata server 106 retrieves a list of clients 104 from another server or computing device. In yet other embodiments, the metadata server 106 only provides the locator table 108 to clients 104 in response to requests from the clients 104 for the locator table 108. In the requests, the clients 104 may indicate the version numbers 206 of locator tables 108 stored on those clients 104. If the current version number 206 shows that the locator table 108 has since been updated, the metadata server 106 provides the locator table 108 in response to the requests. If the clients 104 already have the current locator table 108, then the metadata server 106 simply indicates to the clients 104 that their locator tables 108 are current.

At block 616, the metadata server 106 updates the locator table 108 in response to the failure or addition of a server 102 or to re-balance the load among the servers 102. The metadata server 106 is made aware of the failure or addition by the failed/added server 102. The failed/added server 102 transmits a notification 148 that the server 102 is about to fail or a join message indicating that the server 102 has been added as an available server 102. In one embodiment, metadata server 106 or another server 102 infers the failure of the failed server 102 because the failed server 102 has failed to follow a protocol. In response to receiving such a notification 148 or join message, the metadata server 106 updates the locator table 108 by repeating some or all of operations shown at blocks 602-614.

Example Recovery Techniques

FIG. 7 illustrates a flowchart showing techniques for determining other servers 102 storing tracts that are also stored on a failed server 102 and for instructing those other servers 102 to provide the tracts to additional servers 102, in accordance with various embodiments. At block 702, the metadata server 106 receives a notification 148 of failure from a failing server 102. The notification 148 may be any sort of message, such as a text or XML message. The notification 148 further indicates an IP address of the failing server 102 and, in some embodiments, a cause of the failure or estimated time until the failed server 102 will again be operational.

At block 704, the metadata server 106 determines that a server failure has occurred, noting the server 102 that the notification 148 was received from. In other embodiments, the metadata server 106 determines failure in some other manner. For instance, a server 102 may fail before having an opportunity to transmit a failure notification 148. The metadata server 106 may nonetheless determine the occurrence of the failure in other ways. In one embodiment, each server 102 periodically sends a "heartbeat" message indicating that the server 102 is operational. If the metadata server 106 does not receive such a message from a server 102, the metadata server 106 may determines that the server 102 has failed. In other embodiments, the metadata server 106 receives a message from a client 104 or a different server 102 indicating that a server 102 is unreachable. In response to such a message, the metadata server 106 determines that the server 102 has failed.

At block 706, the metadata server 106 determines representations in the locator table 108 that are associated with the failed server 102. To determine the representations, the metadata server 106 utilizes a name or identifier of the failed server 102 that is used in the locator table 108 to look up entries in the locator table 108 that include that name or identifier. Each of those entries includes a representation that the failed server 102 is associated with.

At block 708, the metadata server 106 determines other servers 102 that are associated with the determined representations. This determining includes selecting one other server 102 for each representation. For example, if "A" is the failed server 102 and is associated with representations "000," "011," and "110," the metadata server 106 may select one other server 102 for each of representations "000," "011," and "110." If "000" is associated with A, B, and C, the metadata server 106 may select server B as the other server 102 for "000." In one embodiment, the metadata server 106 caches a list of the selected other servers 102. When presented with a choice of other servers 102 to select, the metadata server 106 references the cached list and selects as the other server 102 a server 102 not appearing in the list or appearing fewer times. The metadata server 106 thereby selects as many different other servers 102 as possible, thus increasing the collective bandwidth made available for recovery.

At block 710, the metadata server 106 then selects a number of additional servers 102 to store tracts associated with the determined representations. In selecting the additional servers 102, the metadata server 106 maximizes the number of additional servers 102 that are to receive tracts. In one embodiment, the metadata server 106 maximizes the number of additional servers 102 by associating each possible server 102 to a determined representation before associating the same server 102 twice. Also, the metadata server 102 makes sure that the additional server 102 selected for a determined representation is not already one of the servers 102 associated with that representation. The result of the determining and the selecting is a maximized number of other servers 102 writing tracts and additional servers 102 receiving tracts, thereby sending and receiving data at the collective bandwidths of the other servers 102 and additional servers 102.

At block 712, the metadata server 106 then instructs the other servers 102 to write tracts associated with the determined representations to the additional servers 102, at least two of the other servers performing the writing in parallel. The instructions provided to one of the other servers 102 include the representation associated with tracts stored by that other server 102 as well as an identifier or name of the additional server 102, such as an IP address of that additional server 102. Upon receiving the instructions, the other servers 102 each determine which tracts stored by the other servers 102 are associated with the representations. The other servers 102 may determine the tracts by examining the memory table 112 for tract identifiers that are stored as translations and comparing the representations to the prefixes in the translations. In other embodiments, the other servers 102 calculate translations for each tract identifier stored in the memory table 112, in the same manner as described above with regard to the client 104, and compare the calculated translations to the representations. After determining the tracts that are subject to the instructions, the other servers 102 write the tracts to the additional servers 102.

At block 714, the metadata server 106 generates an updated locator table 108 removing the failed server 102 and including the additional servers 102 in its place. Once the updated locator table 108 is generated, the metadata server 106 provides the updated locator table 108 to the clients 104 and servers 102.

Example Storage Scanning Techniques

FIG. 8 illustrates a flowchart showing techniques for scanning server storage 110 for tract identifiers and for constructing a memory table 112 of tract identifiers and tract locations based on the scan, in accordance with various embodiments. At block 802, the server 102 may first note the occurrence of a failure or reboot. For example, server 102 may experience a power outage and reboot.

At block 804, because the memory table 112 storing locations and identifiers of tracts stored in the storage unit memory 110 of the server 102 may now be out of date, the server 102 next scans the storage unit memory 110 for tract identifiers, noting the tract identifiers discovered and their locations within the storage unit memory 110. Also, since the tracts each have the same size and the tract identifiers each have the same size, the server 102 can scan only the tract identifiers stored in the storage unit memory 110, skipping the tracts stored between the tract identifiers.

At block 806, while scanning the tract identifiers, the server 102 caches the tract identifiers and the locations where they are stored. The identifiers and locations are cached in other memory of the server 102, such as cache memory or RAM of the server 102.

At block 808, the server 102 then constructs the memory table 112 based on the cached identifiers and locations, adding an entry to the memory table 112 for each identifier and location pair. Such entries may either be rows or columns of the memory table 112, as illustrated in FIG. 3 and described above. In some embodiments, rather than storing locations of the tract identifiers, the servers 102 utilizes the locations of the tract identifiers, as well as the sizes of tract identifiers and tracts, to calculate locations of the tracts, such as the starting or ending locations of the tracts, and stores those calculated locations with the tract identifiers.

In some embodiments, the memory table 112 constructed by the server 102 also includes the representations associated with that server 102 by the locator table 108. At block 810, these representations are received or retrieved by the server 102 from the metadata server 106. Such receiving or retrieving may occur in connection with the construction of the memory table 112. At block 812, upon receiving the representations, the server 102 stores the representations either in memory table 112 or in another location in the storage unit memory 110.

Example Server Table Updating Techniques

FIG. 9 illustrates a flowchart showing techniques for updating a server memory table 112 based on a partial scan of server storage 110, in accordance with various embodiments.

At block, 902a server 102 selects a size for a part of memory to mark "out of date" that reduces a number of movements of a writing component across the storage unit memory 110 (e.g., a number of movements of a head across a disk storage unit). A part of memory includes at least memory for storing two tracts and less than the total memory for all the tracts. In FIG. 3, for example, the server 102 has selected a size of two tracts for parts of memory. The server 102 may select the size based on any sort of criteria, such as the size of the storage unit memory 110, the size of tracts, etc. In one embodiment, the selection of the size happens only once, during set up of the server 102

At block 904, the server 102 marks entries in the memory table 112 for the first part of the memory as "out of date." The server 102 may perform the marking in response to receiving a first write request 142. If the memory table 112 includes an entry for each tract, then the server 102 determines the number of tracts capable of being stored in the first part of the memory and marks that many entries—an entry for each tract to be stored in the first part of the memory—as "out of date." In other embodiments, the memory table 112 may be constructed with one entry per part of memory, that entry capable of storing one "out of date" marker or multiple identifiers and locations for multiple tracts. In such other embodiments, the server 102 would only mark the one entry "out of date."

In some embodiments, before, during, or after receiving the write request 142 and marking the entries, the server 102 receives read requests 142. At block 906, upon receiving the read requests 142, the server 102 queues the read requests. At block 908, the server 102 performs the read requests 142 when a writing component is within a predetermined distance of a requested tract. For example, if writing component is writing to a first memory location and the read request 142 is for an adjacent memory location, the server 102 may then perform the queued read request 142. By queuing read requests 142 and performing the read requests 142 when the writing component is adjacent to or within a predetermined distance of the requested tract, the server 102 minimizes the number of trips the writing component makes across the storage unit memory 110.

Further, once entries for the first part of the memory have been marked, the server 102 may write tracts received in write requests 142 to the first part of the storage unit memory 110. At block 910, the server 102 first determines which location in the first part of the storage unit memory 110 to write the tract to based on read requests 142. For example, if the server 102 has queued a read request 142 for one memory location and an adjacent memory location belongs to the first part of the storage unit memory 110 and has not been written to, the server 102 selects that adjacent memory location to write the tract to. At block 912, the server 102 then writes the tract to the first part of the storage unit memory 110. Unless the first part of the storage unit memory 110 is full, however, the writing component stays in the vicinity of the first part of the storage unit memory 110 after writing the tract and does not move across the storage unit memory 110 to update the memory table 112.

At block 914, the server 102 caches the identifier of the written tract as well as the location in the storage unit memory 110 that the tract was written to. The cached identifier and location are stored by the server 102 in cache memory or RAM of the server 102 until the writing component moves across the storage unit memory 110 to update the memory table 112.

At block 916, while the server 102 is idle (e.g., not receiving requests 142, the server 102 may update the memory table 112 with the cached identifiers and locations. After updating the memory table 112, the writing component returns to the vicinity of the first part of the storage unit memory 110 to write tracts received in further write requests.

In various embodiments, the server 102 then receives additional write requests 142. At block 918, upon receiving an additional write request 142, the server 102 determines whether the first part of the storage unit memory has been filled. The server 102 may perform the determining by scanning the first part of the storage unit memory 110 for available memory locations or by examining the cached identifiers and locations to count the number of tracts that have been written. If the server 102 determines that the first part of the storage unit memory 110 is not full, then the server 102 repeats the operations shown at blocks 910-916 for the received write request 142.

At block 920, if the first part of the storage unit memory 110 is full, then the server 102 updates the entries in the memory table 112 marked "out of date" with the cached identifiers and locations, writing the cached identifiers and locations to the memory table 112 in order of their memory locations (i.e., in order of the byte location within the storage unit memory 110 that they are associated with). The updating may include writing an identifier and location to each one of multiple entries of the memory table 112 or writing all of the identifiers and locations to a single group entry. Upon completion of the updating, none of the entries in the memory table 112 is marked "out of date."

At block 922, the server 102 marks another one or more entries corresponding to a second part of the storage unit memory 110 as "out of date." After marking the other one or more entries "out of date" and receiving another write request 142, the server repeats the operations shown at blocks 910-922.

At block 924, the server 102 detects that a failure has occurred. Such a failure may be a reboot due to a power outage or some other cause. While the server 102 is shown in FIG. 9 as detecting the failure after performing the marking, the server 102 may detect the failure before, during, or after any of the operations shown at blocks 904-922.

At block 926, upon detecting a failure, the server 102 scans any part of the storage unit memory 110 marked "out of date" in the memory table 112. Because this limits scanning to only a part of the storage unit memory 110, the time-to-recovery from the failure is reduced. The results of the scan—identifiers and locations—are then used to update the entries marked "out of date."

Example Computer System

FIG. 10 illustrates a block diagram showing components of a computer system implementing a server 102, client 104, or metadata server 106, in accordance with various embodiments. In various embodiments, computer system 1000 may include at least one processing unit 1002 and system memory 1004. The processing unit may be any sort of processing unit. Depending on the configuration and type of computing device, system memory 1004 may be volatile (such as RAM), non-volatile (such as ROM, flash memory, etc.) or some combination of the two. System memory 1004 may include an operating system 1006, one or more program modules 1008, and may include program data 1010.

Computer system 1000 may also include additional data storage devices (removable and/or non-removable) such as, for example, magnetic disks, optical disks, or tape. Such additional storage is illustrated in FIG. 10 by removable storage 1012 and non-removable storage 1014. Removable storage 1012 and non-removable storage 1014 may represent the storage unit memory 110 if the computer system 1000 implements a server 102. Computer-readable storage media may include volatile and nonvolatile, removable and non-removable media implemented in any method or technology for storage of information, such as computer readable instructions, data structures, program modules, or other data. System memory 1004, removable storage 1012 and non-removable storage 1014 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer system 1000. Any such computer-readable storage media may be part of the computer system 1000.

In various embodiment, any or all of system memory 1004, removable storage 1012, and non-removable storage 1014, may store programming instructions which, when executed, implement some or all of the above-described operations of the servers 102, client 104, or metadata server 106. In some embodiments, the programming instructions include instructions implementing one or more of the distribution module 132, the recovery module 134, the file system interface 136, the application 138, or the client library 140.

Computer system 1000 may also have input device(s) 1016 such as a keyboard, a mouse, a touch-sensitive display, voice input device, etc. Output device(s) 1018 such as a display, speakers, a printer, etc. may also be included. These devices are well known in the art and need not be discussed at length here.

Computer system 1000 may also contain communication connections 1020 that allow the device to communicate with other computing devices 1022. The communication connections 1020 are implemented at least partially by network interface components.

Example Implementation

FIG. 11 illustrates a block diagram showing an example implementation in nodes of a datacenter having proportioned bandwidths, in accordance with various embodiments. As illustrated, a storage node 1102 implements one of the servers 102, a computation node 1104 implements the client 104, and a node 1106 implements the metadata server 106. The storage node 1102, computation node 1104, and node 1106 may each be a computing device, such as one of the computing devices describe above as implementing the servers 102, client 104, or metadata server 106. In some embodiments, the storage node 1102 implements multiple servers 102 associated with multiple storage devices of the storage node 1102, such as one server 102 per storage device. Also while only one storage node 1102 and one computation node 1104 are shown in FIG. 11, the datacenter may include a plurality of storage nodes 1102 comprising a storage cluster and a plurality of computation nodes 1104 comprising a computation cluster. In some embodiments, the node 1106 is an independent node that is not associated with either a storage cluster or a computation cluster. In other embodiments, the node 1106 is associated with a cluster and may even include a server 102 or client 104, doubling as a storage node 1102 or computation node 1104.

In various embodiments, the storage node 1102, computation node 1104, and node 1106 are connected by one or more switches 1108. In FIG. 11, three switches 1108 connect the nodes 1102-1106, one switch 1108 being directly connected to each of the storage node 1102, computation node 1104, and node 1106. Any number of switches 1108, however, may connect the nodes 1102-1106 to one another. The switches 1108 may be any sort of switches. The switches 1108 also each include network interface components, such as incoming and outgoing network interface components, each network interface component having a bandwidth. For example, a switch 1108 may have a number of incoming Ethernet ports and an incoming wireless port, as well as outgoing Ethernet and wireless ports. In some embodiments, the incoming bandwidth of network interface(s) of a switch 1108 that serve devices "below" the switch 1108 in the network hierarchy is proportioned to the outgoing bandwidth of that switch 1108 up to core switches. For instance, the collective incoming bandwidth of the incoming network interface components of the switch may be ten gigabytes per second, and the collective outgoing bandwidth of the outgoing network interface components may also be ten gigabytes per second. By proportioning the incoming and outgoing bandwidths of a switch 1108, the datacenter avoids introduction of bottlenecks associated with the switches 1108. Such switches 1108 with proportioned bandwidths are described in further detail in [MONSOON APPLICATION].

In some embodiments, as described above, the switches 1108 may comprise one or more networks, such as WANs, LANs, or PANs. In such embodiments, the switches 1108 comprise or are connected to routers and/or devices acting as bridges between data networks.

In various embodiments, the storage node 1102 includes a storage unit 1110, such as the storage device described above, and a network interface component 1112. Each server 102 comprises one storage unit 1110. Each storage node 1102, however, may have multiple server 102 and storage unit 1110 combinations. Also, while only one network interface component 1112 is shown, each storage node 1102 may have multiple network interface components 1112. The storage unit 1110 may be the same storage device as the storage unit memory 110 shown in FIG. 1 and described in greater detail above. The network interface component 1112 may be any sort of network interface component 1112, such as a network interface card, a modem, an optical interface, or a wireless interface.

As shown in FIG. 11, the storage unit 1110 and network interface component 1112 have proportioned bandwidths 1114a and 1114b, respectively. The proportioned bandwidths 1114a and 1114b match or are within a predefined tolerance of one another. For example, the proportioned bandwidth 1114a of the storage unit 1110 could be nine-tenths of a gigabyte per second and the proportioned bandwidth 1114b of the network interface component 1112 could be one gigabyte per second. In proportioning the bandwidths 1114a and 1114b to one another, the storage node 1102 can be provisioned with a network interface component 1112 of a given bandwidth 1114b based on the bandwidth 1114a of the storage unit 1110 or can be provisioned with a storage unit 1110 of a given bandwidth 1114a based on the bandwidth 1114b of the network interface component 1112. If the storage node 1102 includes multiple storage units 1110 or network interface components 1112, the collective bandwidth of the storage units 1110 or network interface components 1112 is proportioned to the bandwidth of the other. If the storage node 1102 includes both multiple storage units 1110 and multiple network interface components 1112, the collective bandwidths of both multiple sets are proportioned to one another.

In various embodiments, the computation node 1104 includes an input/output (I/O) bus 1116 and a network interface component 1118. The client 104 is shown as comprising both the I/O bus 1116 and the network interface component 1118 as a single client 104 is associated with each computation node 1104. The I/O bus 1116 is any sort of I/O bus connecting components of the computation node 1104 such as the network interface component 1118 and any sort of processor, memory, or storage (not shown) of the computation node 1104. The network interface component 1118 may be any sort of network interface component, such as a network interface card, a modem, an optical interface, or a wireless interface. While only one network interface component 1118 is shown as being included in the computation node 1104, the computation node 1104 may have multiple network interface components 1118.

As is further shown in FIG. 11, the I/O bus 1116 and network interface component 1118 have proportioned bandwidths 1120*a* and 1120*b*, respectively. The proportioned bandwidths 1120*a* and 1120*b* match or are within a predefined tolerance of one another. For example, the proportioned bandwidth 1120*a* of the I/O bus 1116 could be four gigabytes per second and the proportioned bandwidth 1120*b* of the network interface component 1118 could also be four gigabytes per second. In proportioning the bandwidths 1120*a* and 1120*b* to one another, the computation node 1104 can be provisioned with a network interface component 1118 of a given bandwidth 1120*b* based on the bandwidth 1120*a* of the I/O bus 1116. If the computation node 1104 includes multiple network interface components 1112, the collective bandwidth of the network interface components 1112 is proportioned to the bandwidth 1120*a* of the I/O bus 1116.

By implementing the servers 102 and client 104 in nodes 1102 and 1104 with proportioned bandwidths, the datacenter avoids bottlenecks associated with network bandwidth in performing the read and write operations of the client 104 and servers 102. Data is written to and read from the storage unit 1110 of a server 102 at the full bandwidth of the storage unit 1110, and requests transmitted and responses received by the client 104 are processed at the full bandwidth of the I/O bus 1116.

The implementation shown in FIG. 11 and described herein is shown and described in further detail in [4931US].

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    identifying, by a client system, at least one server as being associated with a tract of data, the tract of data being one of a plurality of tracts of data comprising a byte sequence and the identifying includes looking up the at least one server in a locator table that distributes the tracts among a plurality of servers, the locator table distributing the tracts by associating servers with tracts based at least in part on translations to fixed lengths of tract identifiers; and
    providing, by the client system, a request associated with the tract to the at least one server.

2. The method of claim 1, wherein the translations ensure that two sequential tracts are associated with different servers.

3. The method of claim 1, wherein the associating comprises associating based on prefixes included in the translations, at least one of the prefixes being shared between multiple translations and the tracts respectively associated with the multiple translations.

4. The method of claim 3, wherein each entry of the locator table includes a prefix and one or more servers associated with the prefix.

5. The method of claim 1, further comprising calculating the translations using a hash algorithm.

6. The method of claim 1, further comprising utilizing at least a prefix included in a translation to lookup the at least one server, the locator table indexing the plurality of servers by prefixes included in the translations.

7. The method of claim 1, further comprising receiving a request for the byte sequence from a file system interface of the client system, the file system interface representing the byte sequence as a file.

8. The method of claim 1, wherein the looking up is based at least in part on a tract identifier of the tract, the tract identifier comprising a byte sequence identifier and a tract sequence number.

9. The method of claim 1, wherein the request is one of a plurality of read requests for the tracts comprising the byte sequence, and the client system receives the tracts from the plurality of servers in parallel.

10. The method of claim 1, further comprising receiving a tract of an empty length in response to a read request for the tract in an event that the tract has not been written to.

11. A computer-readable storage device comprising:
    a plurality of computer-readable instructions stored on the storage medium and configured to program a metadata server system to perform operations including:
        generating a locator table that distributes a plurality of tracts of data among a plurality of servers by associating servers with tracts based at least on a number of available servers and on translations to fixed lengths of tract identifiers, the translations ensuring that two sequential tracts are associated with different servers; and
        making available the locator table to at least one client system.

12. The computer-readable storage device of claim 11, wherein the associating comprises associating based at least in part on prefixes included in the translations, at least one of the prefixes being shared between multiple translations and the tracts respectively associated with the multiple translations,
    wherein the operations further include notifying servers of the prefixes that the servers are associated with, and
    wherein multiple servers are associated with each tract to provide redundancy.

13. The computer-readable storage device of claim 12, wherein a size of the locator table and/or a size of the prefixes are related to a number of the servers that are available.

14. The computer-readable storage device of claim 11, wherein the locator table accommodates the inclusion of new tracts without requiring a refresh or update of the locator table.

15. The computer-readable storage device of claim 11, wherein multiple servers are associated with each tract to provide redundancy.

16. The computer-readable storage device of claim 11, wherein the operations further include updating the locator table in response to a failure of one of the servers or in response to an addition of a new server to the plurality of servers.

17. The computer-readable storage device of claim 11, wherein at least one of the servers is identified in the locator table by an Internet Protocol (IP) address.

18. A client system comprising:
- a processor; and
- a plurality of executable instructions configured to be operated by the processor to program the client system to perform operations including:
  - determining whether a byte sequence has been opened in an append mode or a random write mode;
  - in response to determining that the byte sequence has been opened in an append mode, requesting allocation of a tract of data belonging to the byte sequence and writing to the requested tract; and
  - in response to determining that the byte sequence has been opened in a random write mode, writing to a tract of data belonging to the byte sequence.

19. The client system of claim 18, wherein the operations further include coordinating with other client systems about how to open the byte sequence.

20. The client system of claim 18, wherein the tract allocated in response to the request is a next available tract in the byte sequence.

* * * * *